US009916381B2

(12) United States Patent
Antonelli et al.

(10) Patent No.: US 9,916,381 B2
(45) Date of Patent: Mar. 13, 2018

(54) METHOD AND SYSTEM FOR CONTENT CLASSIFICATION

(75) Inventors: Fabrizio Antonelli, Turin (IT); Marina Geymonat, Turin (IT); Dario Mana, Turin (IT); Rossana Simeoni, Turin (IT); Selcuk Kasim Candan, Tempe, AZ (US); Mario Cataldi, Turin (IT); Luigi Di Caro, Turin (IT); Maria Luisa Sapino, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 734 days.

(21) Appl. No.: 13/142,834

(22) PCT Filed: Dec. 30, 2008

(86) PCT No.: PCT/EP2008/068356
§ 371 (c)(1),
(2), (4) Date: Jun. 29, 2011

(87) PCT Pub. No.: WO2010/075889
PCT Pub. Date: Jul. 8, 2010

(65) Prior Publication Data
US 2011/0264699 A1  Oct. 27, 2011

(51) Int. Cl.
*G06F 17/30* (2006.01)

(52) U.S. Cl.
CPC ................. *G06F 17/30707* (2013.01)

(58) Field of Classification Search
None
See application file for complete search history.

(56) References Cited

U.S. PATENT DOCUMENTS

| 6,233,575 | B1 * | 5/2001 | Agrawal et al. | |
| 6,446,061 | B1 * | 9/2002 | Doerre et al. | 707/738 |
| 6,615,208 | B1 * | 9/2003 | Behrens et al. | 707/754 |
| 6,621,108 | B2 | 9/2003 | Tashiro et al. | |

(Continued)

FOREIGN PATENT DOCUMENTS

| WO | WO 00/77690 A1 | 12/2000 |
| WO | WO 03/027901 A1 | 4/2003 |

OTHER PUBLICATIONS

Halkidi et al., "THESUS: Organizing Web document Collection based on Semantics and Clustering"; 2002; Department of Informatics, Athens University of Economics and Business.*

(Continued)

*Primary Examiner* — Ashish K Thomas
*Assistant Examiner* — Mellissa M Ohba
(74) *Attorney, Agent, or Firm* — Oblon, McClelland, Maier & Neustadt, L.L.P.

(57) ABSTRACT

A processing method for classification of contents in a domain that can be represented through a taxonomy includes generating a first digital mathematical representation of the taxonomy; generating a second digital mathematical representation of text documents different from the contents and containing keywords; processing the first and second digital mathematical representations for enriching the taxonomy, by associating keywords of the text documents with the first digital mathematical representation; generating a third digital mathematical representation of the contents; and processing the first digital enriched mathematical representation and third mathematical representation for classifying the contents in the enriched taxonomy.

17 Claims, 9 Drawing Sheets

(56) References Cited

U.S. PATENT DOCUMENTS

| | | | |
|---|---|---|---|
| 6,886,007 B2* | 4/2005 | Leymann et al. | |
| 2001/0037324 A1* | 11/2001 | Agrawal et al. | 707/1 |
| 2002/0026297 A1* | 2/2002 | Leymann et al. | 703/1 |
| 2006/0235870 A1* | 10/2006 | Musgrove | 707/102 |
| 2007/0073745 A1* | 3/2007 | Scott | G06F 17/30737 |
| 2007/0078889 A1 | 4/2007 | Hoskinson | |
| 2008/0027929 A1 | 1/2008 | Rice et al. | |
| 2008/0195581 A1 | 8/2008 | Ashmore et al. | |
| 2010/0070448 A1* | 3/2010 | Omoigui | H01L 27/1463 706/47 |
| 2010/0235313 A1* | 9/2010 | Rea | G06F 17/30265 706/52 |

OTHER PUBLICATIONS

Kim et al.; "Keyword Weight Propagation for Indexing Structured Web Content", Workshop and Web Mining and Web Usage Analysis (WebKDD), pp. 1-10, (2006).

Kim et al.; "CP/CV: Concept Similarity Mining without Frequency Information from Domain Describing Taxonomies", CIKM 2006, pp. 1-10, (2006).

Xu et al.; "Query Expansion Using Local and Global Document Analysis", Proceedings of the $19^{th}$ Annual International ACM SIGIR Conference, Zurich, pp. 4-11, (1996).

Ruthven et al.; "A Survey on the use of Relevance Feedback for Information Access Systems", The Knowledge Engineering Review, vol. 18, No. 95-145, Cambridge University Press, pp. 1-53, (2003).

Salton et al.; "Term-Weighting Approaches in Automatic Text Retrieval", Information Processing & Management, vol. 24, No. 5, pp. 513-523, (1988).

Arnaudo; "Integrazione di Informazioni Tassonomiche Eterogenee, Eventualmente Inconsistenti", University of Turin, Paragraph 8.3, pp. 81-90, (2007).

International Search Report from the European Patent Office for International Application No. PCT/EP2008/068356, dated Apr. 3, 2009.

* cited by examiner

METHOD AND SYSTEM FOR CONTENT CLASSIFICATION

CROSS REFERENCE TO RELATED APPLICATION

This application is a national phase application based on PCT/EP2008/068356, filed Dec. 30, 2008.

TECHNICAL FIELD OF THE INVENTION

The present invention relates to the content management field and therefore to those techniques for supporting the evolutionary life cycle of digital information, that is, digital content. In general, digital contents may be texts (such as documents), multimedia files, audio or video files, or any other type of file that requires organized management of its evolutionary life cycle.

PRIOR ART

Because of the vast quantity of contents originating from different sources (Web, media, etc.) accessible by each person, the need for a fully-developed organization of data associated with contents to simplify research, navigation and control operations is strongly felt in the content management field. Some efforts have been made in this direction through digitization, indexing and storage of contents. This has been applied, for example, in the common content search services on the Web, in document management or content sharing systems (such as Google, or, in the area of video contents, YouTube).

The need has also emerged to manage these contents in a way that is more compatible with the organization that people make of the subjects. This method of organizing contents was developed in the area of knowledge management—examples of this are collaborative systems for managing business information (like the SAP software).

Today the most widespread systems for organizing contents use structured metadata, which is data associated to contents that describe their characteristics, as a fundamental element for content access operations. Examples of these are faceted systems, based on hierarchies of values which each metadata associated with a content can assume. For example, consider the e-commerce systems that adopt faceted navigation, like those of Amazon, or tag-based systems (textual metadata) associated with the contents of a reference community (an example is Delicious (delicious.com), the site for sharing bookmarks).

The Applicant has noted that systems based exclusively on metadata have limits, due to the necessity of having complete information for each used metadata, which makes it impossible to do without the chosen metadata and form relations with different metadata automatically.

Other known systems are those for document management based on free text: these allow content to be organized according to the text that describes or characterizes it. The Applicant has noted that this type of document management has the limit that the effectiveness of its management is critically dependent upon the descriptive quality of the text used.

In the content management area, typical methods of information retrieval are used, and methodologies have been described that are based on techniques derived from the knowledge discovery and data mining fields, which handle the problems of automatic search through great quantities of data. In keeping with valid definitions in the area of information retrieval, the "domain" is a topic area that can be represented by a "taxonomy" or "ontology." A taxonomy is a hierarchical structure within which the concepts that populate the domain are called nodes and the links between them are called arcs. A taxonomy can be represented by an acyclic interconnected graph (that is, a graph wherein all the nodes are connected through at least one arc, and there are no cycles, or rather, there are no distances composed of arcs that start and end within the same node).

A taxonomy T can be expressed by the notation $T=<V,E>$, where V is the set of nodes, each of which represents a concept, and E is the set of arcs between the nodes, each of which represents an asymmetrical relationship between the nodes at the ends. For example, in a taxonomy representing the domain of a particular family it may be the case that an arc that connects two nodes represents a non-reversible relationship between them; for example MARCO "is a son of" PAOLO, where MARCO and PAOLO are two nodes, and "is a son of" is the arc that connects them. Refer to the example in FIG. 9, which shows taxonomy of generic family relationships. The highest concept in the hierarchy is called the root (for example, the Person node), concepts for which there is no outgoing node are called leaves, (for example, the Father node).

Typically, the concepts inside the taxonomies are associated with a label that identifies them unambiguously. The label is a string having a meaning for the language wherein the taxonomy is written. Preferably, taxonomies are written in a formal language such as that represented by the OWL standard (Web Ontology Language). Another language that can be used to represent taxonomies is RDF (Resource Description Framework), defined by the World Wide Web Consortium (W3C).

The document US-A-2007-0078889 describes an automatic method for extracting and organizing text documents pertaining to a specific area. According to this method, a taxonomy is constructed starting with key phrases excerpted from the documents being organized. The document US-A-2008-0195581 describes a system for storing enclosures according to which each enclosure has associated with it an identifier chosen on the basis of the topology of a computer network that interconnects the devices that make up the storage system.

The document U.S. Pat. No. 6,621,108 describes search engines that use the technique of topic distillation based on the search for documents related to the topic of the query but which do not necessarily contain a word or a string of the query. Also described is an algorithm for propagating keywords that lets a text be expressed through weights that also take into account the contributions of other texts related to the one being considered. An algorithm for propagating keywords is described by J. W. Kim and K. Selcuk Candan in "Keyword Weight Propagation for Indexing Structured Web," Workshop on Web Mining and Web Usage Analysis (WebKDD) 2006.

Below are indicated documents, familiarity with which is useful for understanding particular forms of implementation of the present invention. In the paper by Jong Wook Kim, K. Selçcuk Candan, "CP-CV: Concept Similarity Mining without Frequency Information from Domain Describing Taxonomies," CIKM 2006 Nov. 6-11, 2006, a method for representing the nodes of a taxonomy is described. According to this article, each node of the hierarchical structure can be represented by means of a concept vector, which reflects the existing semantic relationships between the nodes of the taxonomy, and which can be expressed through weights associated with neighboring concepts. The concept vector is constructed according to an algorithm for "concept propagation," which allows the suitable association of weights with different components of the vectors corresponding to single nodes of the taxonomy.

In the paper by Jinxi Xu and W. Bruce Croft, "Query Expansion Using Local and Global Document Analysis", Proceedings of the 19th Annual International ACM SIGIR Conference, Zurich, Switzerland, 1996) the methods of query expansion and relevance feedback (specifically, the technique of local feedback used in the area of information retrieval to resolve problems associated with the mismatching of words) are described. According to the technique of query expansion, the query is expanded using words or phrases with a meaning similar to that of the query, increasing the possibility of word matching in the relevant documents. Using the technique of local feedback (special case of relevance feedback), the search is performed only on the documents recovered by the original, unexpanded query and not on the entire body of available documents. Some techniques of relevance feedback are also described by Ian Ruthven, Mounia Lalmas in "A survey on the use of relevance feedback for information access systems," The Knowledge Engineering Review (2003), 18: 95-145 Cambridge University Press.

G. Salton and C. Buckley in "Term-weighting approaches in automatic text retrieval," Information Processing & Management Vol. 24, No. 5, pp. 513-523, describe a technique of representation of written tests and search of the same based on the use of weights associated with the terms of the text. Also, in the thesis for Bachelor of Arts by Erik Arnaudo, in Sistemi per it Trattamento dell'Informazione, University of Turin, September 2007, "Integrazione di informazioni tassonomiche eterogenee, eventualmente inconsistenti," paragraph 8.3 pp. 81-90, is described a method for selecting candidate elements for a matching based on the application of a similarity function among vectors and calculation of an ordered sequence of values representative of the difference between these similarities.

SUMMARY OF THE INVENTION

The Applicant has noted that the present methods for content classification are not at all satisfactory and that opportunities to use methods for automatic classification of contents that tend to approach those organization methods usable by a human being seem to be of greater and greater interest.

The Applicant has perceived that by associating keywords found in text documents (for example, those belonging to a specific cultural context) with a taxonomy within which contents have to be classified leads to an enrichment of the taxonomy that reflects positively on the search and consultation of the catalog that would result from the content classification.

The subject of the present invention is a method for content classification as described in claim 1 and its specific embodiments as described in claims 2 to 15. With regard to another aspect, the invention relates to a content classification system as defined in claim 16 and the specific forms of implementation described in claims 17 to 19. Also part of the invention is a computer program defined in claim 20.

BRIEF DESCRIPTION OF THE DRAWINGS

Exemplified and non-limiting embodiments of the invention are described in detail hereinafter, with reference to the enclosed drawings, wherein.

DETAILED DESCRIPTION

Classification System

Figure 1:
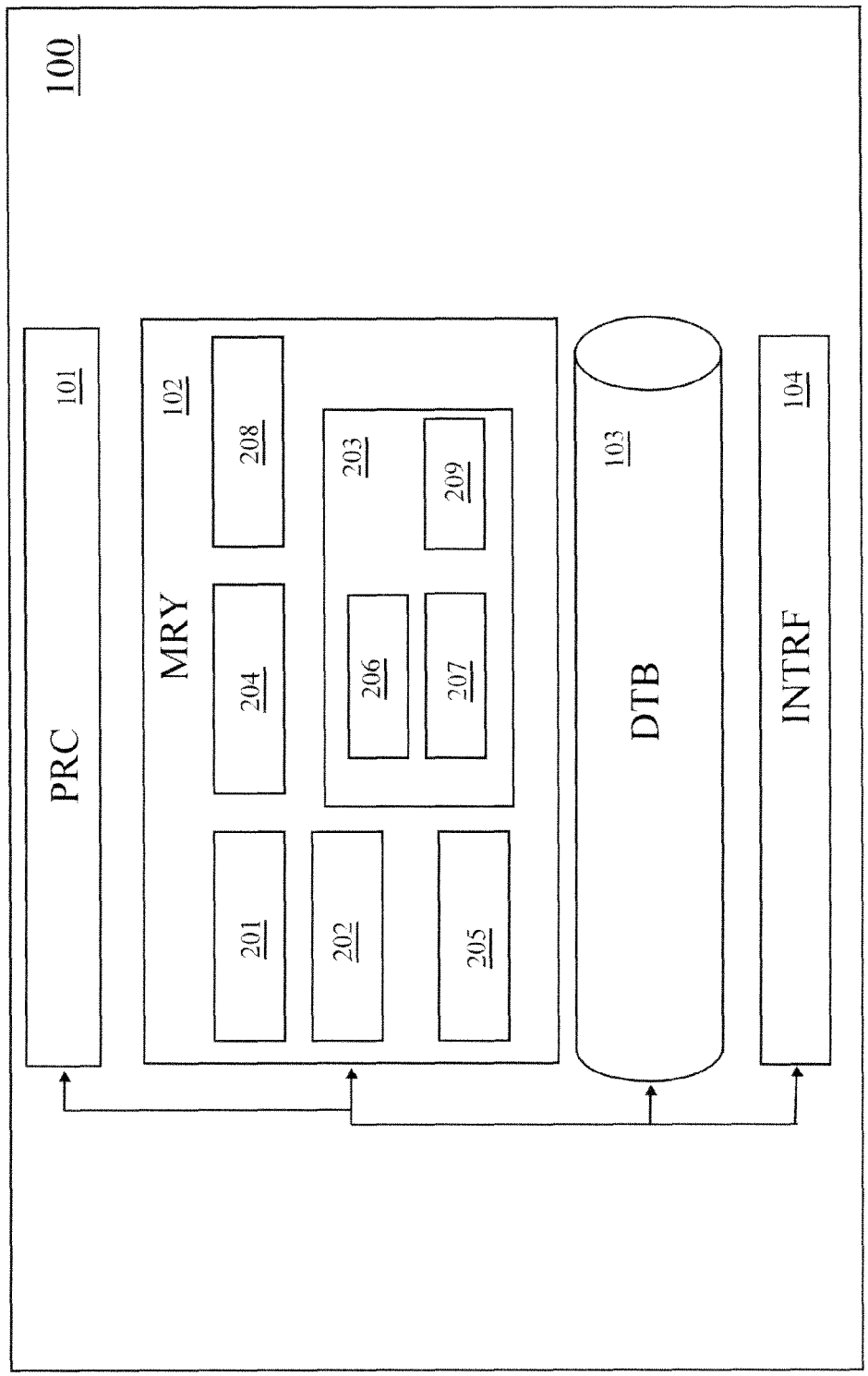
FIG. 1 shows schematically a content classification system in accordance with an example of the invention.

FIG. 1 shows a computer system for content classification 100, which follows a particular embodiment of the invention. In particular, the computer classification system 100 (from now on also classification system 100, in short) can be used for classifying contents pertaining to the television domain such as, for example, films, documentaries, videos, reportages or others. Nevertheless, the teachings of the invention are applicable to the entire field of content management and not only to cinematic (i.e. motion-picture) or television content but also to other kind of contents such as, for example: books, audio contents, personal contents, or other contents having associated with them a text, typically written, that describes them.

Returning to the specific classification system 100, it comprises a processor 101, (PRC), a memory 102 (MRY), a database 103 (DTB) and a user interface 104 (INTRF). According to an example embodiment, the memory 102 comprises a RAM (Random Access Memory) with at least 3 Gb of capacity, and the processor 101 is of a double type with speed at least equal to 2.5 GHz and includes an operative system adapted to support Java programs.

Specifically, the memory 102 stores a plurality of software modules configured to perform computing, processing or apply algorithms according to the example of the invention herein described. In this example, the following are included in the memory 102: a first generation module of keyword vectors 201, a second generation module of vectors 202, an enrichment module 203, a third generation module of keyword vectors 204, a module of latent relations determination 208 and a classification module 205. In particular, the enrichment module 203 comprises a module for the application of a similarity function 206, a keyword selection module 207 and a keywords integration module 209. The user interface 104 can allow loading of data necessary for the classification, the subsequent updating of these data and/or consultation of the database 103.

Classification Method

Figure 2:
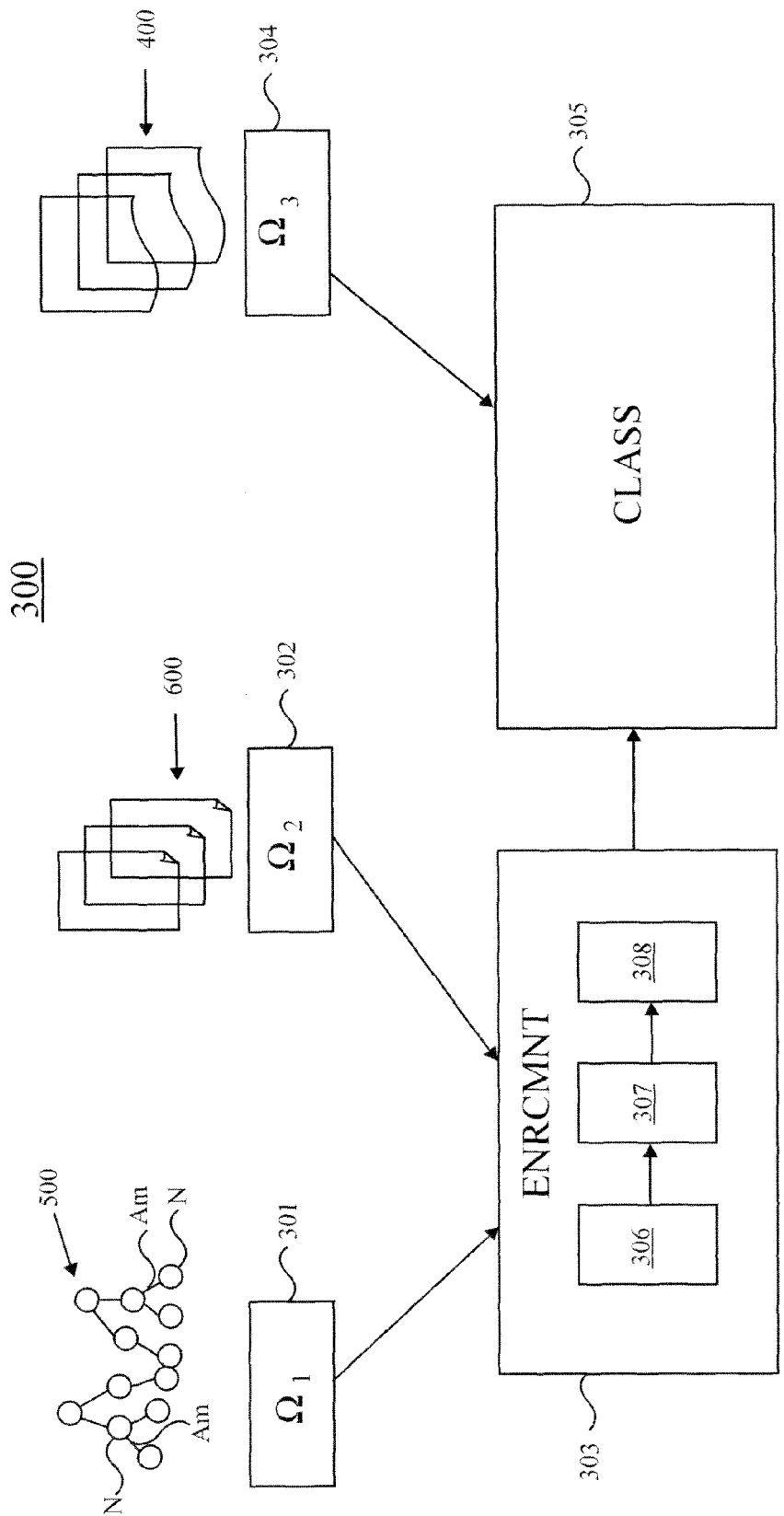
FIG. 2, using functional blocks, shows a method for content classification in accordance with a specific embodiment of the invention.

With reference to FIG. 2, which shows a flow chart, it describes an example of a method 300 for television content classification, which can be implemented with the classification system 100. FIG. 2 schematically illustrates: a plurality of text descriptors 400 associated with cinematic contents to be classified, one or more domains 500 and 501 and a plurality of context documents 600, different from contents 400. The text descriptors of contents 400 (from here on also descriptors of content or contents) are written texts that describe the cinematic contents and for example, can derive from different sources such as books, Web, printed paper, speech-to-text analysis, etc. The text descriptors 400 can be stored in the memory 102 or in the database 103.

Domains 500 and 501 are topic areas wherein the contents are classified. For example, the following domains can be selected: cinematic genres, geographical locations, historic events, art, sport, artists. In the following, for clarity of description, reference will be made to only two domains, but the teachings of the invention are also valid for a single domain or for a greater number of domains. As is known, the information about a domain can be represented through taxonomies, that are hierarchical structures within which the concepts that populate the domain are called nodes N and the relationships linking the nodes are called arcs An. In FIG. 2, domains 500 and 501 are represented by symbolic hierarchical structures, typical of taxonomies that can be expressed in digital form and stored in the memory 102 or in the database 103. Nodes N are associated with concepts that can be expressed by a label. For example, the taxonomy of the domain 500 refers to the cinematic genres domain, and its nodes indicate the horror, comic, western genres, etc. According to this example, the western genre in its turn comprises the spaghetti western genre, the chorizo western genre, etc. These concepts therefore represent categories of film. For example, the taxonomy of domain 501 refers to the domain of geographic locations, and under the "root node" (that is, the highest node in the hierarchical structure), in this case the node "world," includes the five continents to which are referred the arches relative to the nations on each continent, down to cities and villages, etc.

The context documents 600 are written texts belonging to a cultural context or area defined by the person who makes the content classification. For example, the chosen cultural context may be the national reality, and as context documents articles from a national daily newspaper may be chosen.

Return to classification method 300, which comprises a generation step 301 of first keyword vectors $\Omega 1$ representative of the taxonomies associated with domains 500 and 501. In other words, associated with the concepts (nodes) of taxonomy 500 relating to cinematic genres domain is a vector representation based on keywords chosen among those which express the labels of that taxonomy, such as, for example: comic, western, spaghetti western, etc. As will be explained in more detail further on, keyword vectors, belonging to the concepts vectorial space, can be expressed as weights associated with each chosen keyword, so complying with the hierarchic structure. Thus, the vector associated with the western concept (or node) will be expressed by corresponding weights that are also related to other nodes in the taxonomy, such as the comic, horror, Italian western nodes, etc. The generation of these first keyword vectors $\Omega 1$ can be done through the above-defined first generation module 201.

Furthermore, classification method 300 includes a further generation step 302 of second keyword vectors $\Omega 2$ obtained from context documents 600. In this case, associated with the context documents is a vector representation based on keywords chosen from such texts and expressible using weights. Generation of such second keyword vectors $\Omega 2$ can be made by means of the second generation module 202.

In another generation step 304 third keyword vectors $\Omega 3$ are generated, representative of the text descriptors 400 of the contents to be classified. Associated with the contents to be classified is a vector representation based on weights associated with keywords chosen among the text descriptors 400. The generation of such third keyword vectors $\Omega 3$ can be made with techniques (an example is given farther on) similar to those usable for generating second keyword vectors $\Omega 2$ associated with the context documents. For example, third generation module 204 of the classification system 100 can be configured to generate such a vector representation of text descriptors 400.

Classification method 300 includes an enrichment step 303 (ENRCMNT) wherein the second keyword vectors $\Omega 2$ relating to the cultural context are associated with the first keyword vectors $\Omega 1$ relative to the taxonomy of domains 500 and 501. In this enrichment step 303 added to the vectors and thus to the concepts representative of domains 500 and 501 are keywords drawn from vectors relative to context documents 600. Returning to the particular example under consideration, enrichment ensures that the vectors representing the taxonomies of cinematic 500 and geographical 501 domains also contain other keywords belonging to the text documents 600 derived from the Italian journalistic context. For example, enrichment of the "Western" concept in the cinematic genres domain with keywords derived from newspaper articles could lead to associating this concept with other keywords such as: rifle, horse, Indian. This enrichment of the "Western" concept has positive effects on the content classification and researchability. Enrichment 303 can be implemented through the enrichment module 203 and, as will be explained farther on, includes, preferably, a step of classification of context documents 306 (which can be made using the application module of the similarity function 206), a keywords selection step 307 to be used in enrichment (which can be carried out by the selection model 206) and an enrichment integration step 308, which can be performed by the integration module 209

In a classification step 305 (CLASS), contents 400 are associated with the domain taxonomies as enriched, through an association of the third keyword vectors $\Omega 3$, representing text descriptors 400, with the keyword vectors representing the taxonomies as resulting from the enrichment. To make this classification one can use, for example, an algorithm of similarities between vectors, as will be described farther on. The classification can be made using the classification module 205 of the classification system 100.

The result of this classification is, advantageously, a hierarchical (digital) catalog of concepts (or categories) of the cinematic genres domains within which are contents having uniform semantics. This catalog can be stored in database 103 shown in FIG. 1. With reference to the positive consequences of the enrichment, the following example may be considered. Let us suppose that one of the content 400 is a film set on the Mole Antonelliana located in Turin, and that in the plot there is no explicit mention of the city of Turin. According to the example, the keyword Mole is not found in the geographic taxonomy that is the starting point, but only the labels ITALY, PIEDMONT, TURIN, etc. This means that if the content classification were made solely on the basis of taxonomies 500 and 501 (without enrichment), in no way could the film set on the Mole Antonelliana be associated with the node TURIN. Upon the enrichment step 303, all the keywords selected from newspaper articles (that is, the context documents 600) that mention Turin and that cite the Mole associated with domain taxonomies 500 and 501, will ensure that the concept TURIN will also described by the label (keyword) Mole Antonelliana.

Therefore, in the catalog consultation resulting from the film set on the Mole Antonelliana, the node TURIN, in its turn, will also be associated to other possible cinematic contents. Enrichment step 303 strongly influences the organization of contents, making possible the achievement of a more proximate organization, compared to conventional classification techniques, to one producible by the human being and that also simplifies the search operations.

The software modules described with reference to classification system 100 contain program codes appropriate for the implementation of classification method 300. Also, notwithstanding the fact that in this description, reference has been made to a vector representation of the domain taxonomies 500 and 501, context documents 600 and text descriptors 400 of contents, the teachings of the invention are also applicable to methods of mathematical representation, which a expressed in digital form, that are not vectorial but of another type, however such as to define a metric of comparison between vectors for the purpose of verifying their similarity. Particular embodiments of the steps of method 300 based on the vectorial representation type will be described below.

Generation Step 301 of the First Keyword Vectors

In the generation step 301 are explained the hierarchical links existing in the domain taxonomies under consideration and, for that purpose, an entire keyword vector is associated to each concept initially identified by a label (for example, "Piedmont"). Within a taxonomy, the set of keywords that compose the vectors associated to concepts is represented by all the labels initially associated to concepts within the taxonomy (for example "Asia," "Europe," "America," and so on).

Advantageously, the generation step of the first keyword vectors 301 is performed so as to create for each concept a vector that contextualizes that concept (represented by a label) inside the domain wherein it is inserted. In more detail, the components of the first vectors $\Omega 1$ associated to each concept are defined in such a way as to reflect the existing relationships between the nodes of taxonomies 500 or 501, according to the structure of the given taxonomy. In particular, the terms associated to the nodes of the taxonomy are "propagated," in order to participate (with the appropriate weights) in the definition of concepts near them in the given taxonomy.

An algorithm usable for this generation step 301 is, particularly, the algorithm Concept-Propagation/Concept-Vector (CP/CV), described in the above-mentioned paper by Jong Wook Kim, K. Selçuk Candan, also defined "concept propagation." The concept propagation method (CP) in their vector representation (CV) has the objective of explicitly representing the contextualization of the individual concepts (labels) of the initial taxonomies. In accordance with this methodology, each concept has associated with it the information on the contribution that all the other concepts, present in the same taxonomy, make to its meaning in that context. The theoretical basis of this concept propagation method is described in the section "Concept propagation method" at the end of the present description.

The Concept Propagation Method

Introduction

Each generic taxonomy T(V,E) is associated with a corresponding concept space (CS), whose size m is equal to the cardinality of V, that is, to the number of concepts present in the considered taxonomy.

Considering the taxonomy T(V,E), and given the corresponding concept space, let m be the size of that space. Each node $v_j \in V$ will correspond to a concept vector $$\Omega_{vj} = [w_j(v_1), w_j(v_2), \Lambda, w_j(v_m)] \quad (1)$$

wherein each component $w_j(v_k)$ denotes the weight of the concept associated with the $k^{th}$ component in the characterization of the semantics of the concept (node) $v_j$.

The objective of the algorithm for the concept propagation is to associate with each node of the taxonomy (for example, the taxonomy of cinematic genres domain 500) a concept vector.

First Embodiment of the Concept Propagation Method

Figure 3:
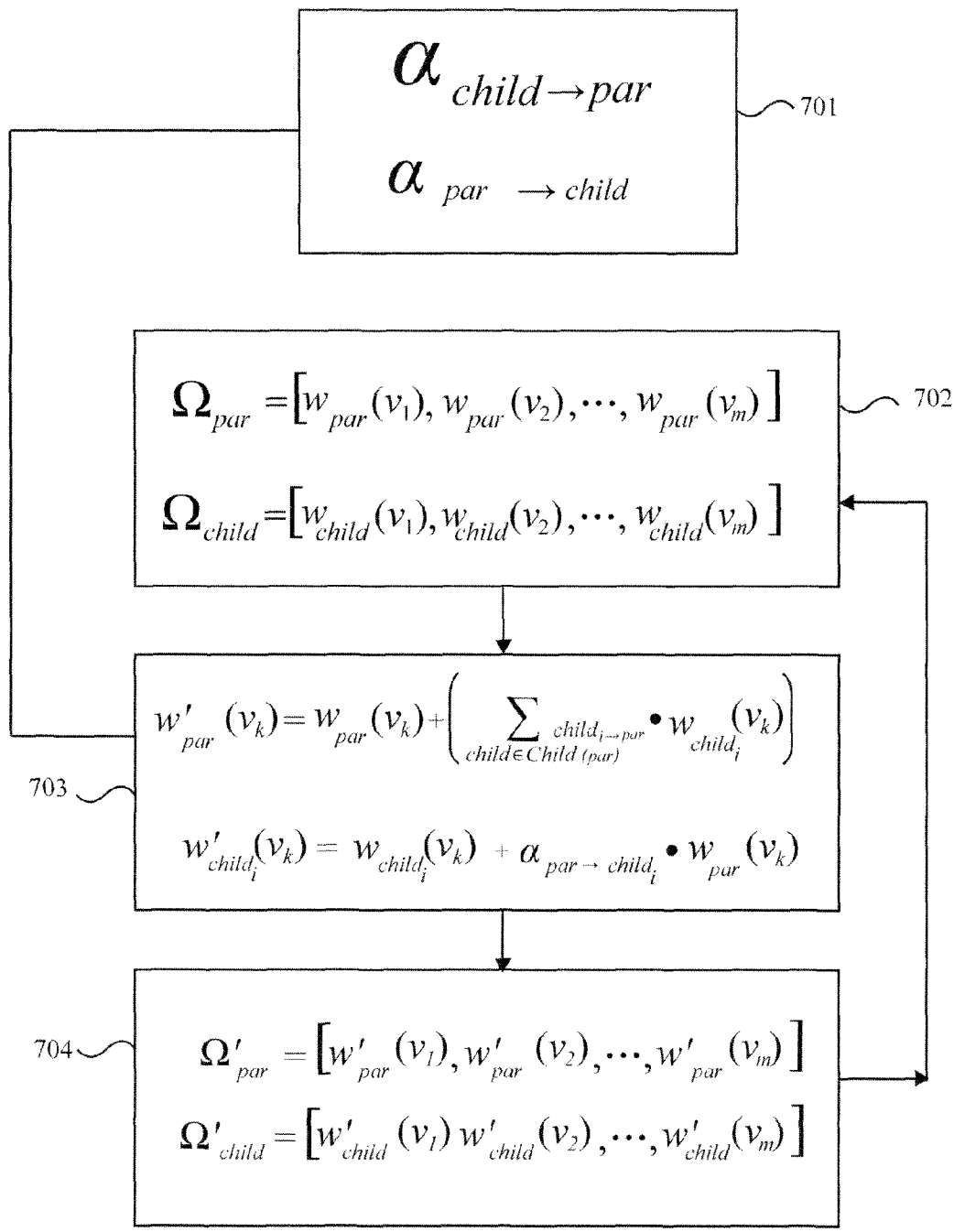
FIG. 3, using a flow chart, shows an embodiment of one stepstep of generation of a vector representation of concepts of a taxonomy, FIG. 4, using a flow chart, shows an embodiment of one stepstep of generation of a matrix representation of a taxonomy, FIG. 5, using a flow chart, shows an embodiment of one embodiment of generation of a vector representation of written texts, FIG. 6, using a flow chart, shows an embodiment of a classification stepstep for text documents in a taxonomy.

Refer to FIG. 3, which represents schematically a first embodiment of the concept propagation method 700, applied to the taxonomy of the geographic domain 501. Similar considerations are valid for the other taxonomy associated with the cinematic genres domain 500. Concept propagation between adjacent nodes takes place taking into account the associated semantics, in the hierarchies described by a taxonomy, with the existence of an arc between two nodes. Particularly, the concept associated with a parent node subsumes each concept associated with child nodes, that is, each object that belongs to the class identified by child can also be considered as belonging to the class identified by parent. To reflect this consideration, the weight of the concept associated with the child is completely propagated in the vector associated with the parent.

This aspect of propagation is expressed by appropriate coefficients that govern the degree of propagation between nodes of the hierarchy. Therefore, in a definition step 701 are defined the following coefficients:

$\alpha_{child \rightarrow par}$: coefficients of propagation from child node to parent node;

$\alpha_{par \rightarrow child}$: coefficients of propagation from parent node to child node.

The coefficients of propagation from child node to parent node $\alpha_{child \rightarrow par}$, assume the value 1. The coefficients of propagation from parent node to child node, to the contrary, reflect the structure of the hierarchy, and the coefficient $\alpha_{par \rightarrow child}$ can be calculated in a way that will guarantee respect of a condition illustrated in the section "Concept propagation method" with reference to the formula (22).

In an initialization step 702 the following vectors of nodes of taxonomy 501 are defined:

$$\Omega_{par}[w_{par}(v_1), w_{par}(v_2), \Lambda, w_{par}(v_m)]$$

$$\Omega_{child} = [w_{child}(v_1), w_{child}(v_2), \Lambda, w_{child}(v_m)]$$

Where the vector $\Omega_{par}$ is the vector of an internal node (parent node) and the vector $\Omega_{child}$ is associated with one of its child nodes. In a first step of the iteration of method 700, the two vectors will each have a unique weight different from zero and itself corresponding to the respective dimension. That is, for example, the parent vector of the concept Turin will have all null weights except the weight of the Turin dimension, which will be equal to 1.

At the processing 704 step, the following transformed vectors are generated:

$$\Omega'_{par} = [w'_{par}(v_1), w'_{par}(v_2), \Lambda, w'_{par}(v_m)]: \text{transformed parent vector}$$

$$\Omega'_{child} = [w'_{child}(v_1), w'_{child}(v_2), \Lambda, w'_{child}(v_m)]: \text{transformed child vector}$$

wherein weights w' are obtained starting with the propagation coefficients between the two nodes, respectively $\alpha_{par \to child}$ and $\alpha_{child \to par}$, with the following relationships, corresponding to a step 703 of weight calculation:

$$w'_{par}(v_k) = w_{par}(v_k) + \left( \sum_{child_i \in Child(par)} \alpha_{child_i \to par} \cdot w_{child_i}(v_k) \right) \quad (2)$$

$$w'_{child_i}(v_k) = w_{child_i}(v_k) + \alpha_{par \to child_i} \cdot w_{par}(v_k) \quad (3)$$

As is clear from relation (3), the coefficient $w_{par}'$ of the parent vector transformed by the dimension $v_k$ is given from the weight that the vector took on at the previous step added to a term dependent on the propagation coefficients from child to parent of each child node and by the weights of the respective child vector, relative to the same dimension. Specifically, this term is the summation of products between the coefficients of propagation from child to parent of each child node with the weights of the respective child vector relative to the same dimension $v_k$. In expression (2), the notation child(par) indicates the set of the child nodes of the parent node.

As is clear from relationship 3, the coefficient $w'_{child}$ of a transformed vector of an $i^{th}$ child node by the dimension $v_k$ is given by the weight that the vector assumed in the previous step added to a term dependent (for example, by a product) from the $i^{th}$ coefficient of propagation from parent to child and from the weight of the respective child relative to the same dimension. The coefficient $\alpha_{child \to par}$ is, as has been stated, equal to 1.

Since, during propagation, the parent node inherits all the concepts represented in the vector associated with the child, after the propagation each child node will have all the significant dimensions (that are not null) in common with the dimensions (significant) of the parent node. Method 700 can continue iteratively until all the nodes of taxonomy 500 have influenced every other node of that taxonomy. The cycles number of the iterative method 700 can have a maximum value equal to the double of the taxonomy deep (where such deep is the number of the taxonomy levels). Alternatively, the method is interrupted before the maximum value is reached and, as an example, the processing is discontinued when during weights computing according to formulas (2) and (3) the additional term depending on the coefficients of propagation is less then a pre-established value.

The vectors of the concepts are transformed iteratively, at each step reflecting the effect of the concept propagation between adjacent nodes. Each individual propagation will for its part be reflected in the nodes transitively adjacent to those just modified.

For example, at the end of methodology 700, the node of the concept Turin will be represented by: a weight equal to 1 associated with the keyword Turin, a weight equal to 0.8 associated with the keyword Piedmont (parent node), a weight equal to 0.1 associated with the keyword Poirino (Poirino is a small town near Turin) and so on for the other nodes of the geographic taxonomy 501.

Second Embodiment of the Concept Propagation Method

According to this second embodiment, the concept propagation at the level of an entire hierarchy can advantageously be compactly represented by means of a matrix notation. The matrix notation has a descriptive meaning of the procedure, and the creation of the propagation algorithm, by means of the particular structure of the data on which it is operating can alternatively be performed with any other adequate recursive method.

Figure 4:
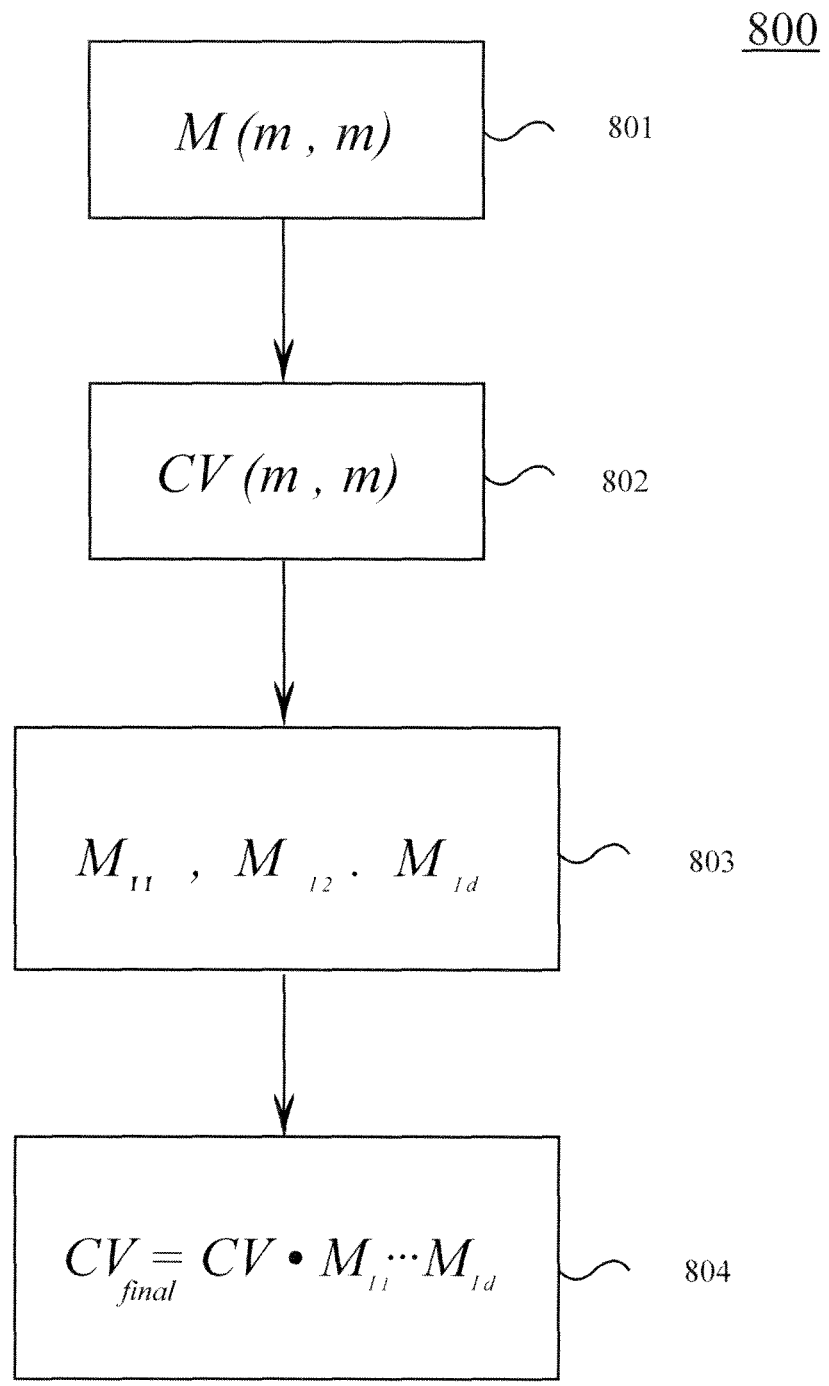

Refer to flow chart 800 shown in FIG. 4. In a first step 801, a matrix of propagation by adjacency M(m,m) is defined. In greater detail, given a taxonomy T(V,E), the corresponding matrix for propagation by adjacency is a matrix M(m,m) defined in the following way:

if an arc $e_{ij} \in E$ exists, i.e. if node $v_i$ is the parent of node $v_j$ then $$M[i,j] = \alpha_{v_i \to v_j}, \text{ and } M[j,i] = \alpha_{v_j \to v_i} = 1 \quad (4)$$

otherwise $$M[i,j] = M[j,i] = 0 \quad (5)$$

Where $\alpha_{v_i \to v_j}$ is the coefficient of propagation of the $i^{th}$ parent concept to the $j^{th}$ child concept and $\alpha_{v_j \to v_i}$ is the coefficient of propagation of the $j^{th}$ child concept to the $i^{th}$ parent. By definition, the values on the diagonal of the propagation matrix by adjacency are all equal to 0.

In a second definition step 802 a matrix for representation of the concept vectors CV(m,m), the $k^{th}$ column and row of which correspond to the concept vector associated with the node $v_k \in V$ of the given taxonomy is introduced. The concept propagation can be expressed by means of a propagation matrix of concepts P(m,m), wherein each element P[k,i] is the cumulative weight relative to the concept propagation $c_k$, associated with the dimension k, in a vector $\omega_{v_i}$:

$$P[k, i] = \sum_{1 \le h \le m} CV(k, h) \times M[i, h] \quad (1)$$

Using the $\oplus$ to denote the operator concept propagation, the following equality is valid: $P = CV \oplus M = CV \cdot M$, where $CV \cdot M$ is the matrix produced by the two indicated. The weights accumulated after an iteration of the propagation operator $\oplus$ are added to those previously existing in the matrix of the concept vectors. The new concept matrix, which incorporates the effect of an iteration of propagation, becomes $$CV_1 = CV + P = CV + (CV \oplus M) = CV + CV \cdot M = CV(I+M) \quad (7)$$

where I is the identity matrix.

Considering that all the values on the M diagonal are equal to 0, indicating with $M_1$ the sum matrix (I+M), obtained by M, replacing each 0 on the diagonal with 1, after the following steps, the general formulation of the propagation process is obtained:

Step 0: $CV_0$ (8)

Step 1: $CV_1 = CV_0 + P_1 = CV_0 = (CV_0 \cdot M_1) = CV_0 \cdot M_{I1}$

Step 2: $CV_2 = CV_1 + P_2 = CV_1 + CV_1 \cdot M_2 = CV_1 \cdot (I + M_2)$ $$= CV_1 \cdot M_{I2} = CV_0 \cdot M_{I1} \cdot M_{I2}$$

...

$$CV_{final} = CV \cdot M_{I1} \cdot M_{I2} \cdot M_{I3} \cdot \Lambda \cdot M_{Id}$$

where d is the diameter of the taxonomy, which is the length of the maximum path in the taxonomy tree. In a calculation step 803 the matrices $M_{Ij}$ are valuated.

As is clear from the preceding relations, each $M_{I_j}$ matrix of relation (8) is a matrix containing the coefficients of propagation of weights in the vectors of each concept at the $j^{th}$ step. The values derive from those contained in the matrix of the concept vectors $CV_{j-1}$ at the preceding step, using the propagation of weights explained in particular by solving the equation (22), mentioned in the section "Concept propagation method", in order to obtain the values of the propagation coefficients. Initially, the matrix $CV_0$ is binary (only 0 and 1) that is, it contains a single 1 in each column (each of which corresponds to a concept vector), corresponding to the dimension associated with the relative concept in the column in question. In the subsequent step the weights relative to the first iteration will be added according to the propagation formula (3): the propagation values will be inserted in $P_1$ ($P_1 = CV_0 \oplus M_1 = CV_0 \cdot M_1$). Thus, each step is written as: $CV_{j-1} + P_j$. In a further calculation step 804, the matrix $CV_{final}$ is evaluated as expressed by the formula (8).

Third Embodiment of the Concept Propagation Method

This third embodiment can be based on the iterative method described with reference to FIG. 3 or else the matrix one of FIG. 4 or by using alternative algorithms. The third embodiment implies the use of propagation coefficients $\alpha$ decreasing with the number of iterations or with the increase of the index n of the matrix $M_{In}$ of formula (8).

The Applicant has noted that the choice of this type of propagation coefficients allows to reduce the instances of "topic drifting" that occurs in the case of very articulated taxonomies (that is, very long trees), by applying the concept propagation method described in the above-mentioned paper by Jong Wook Kim and K. Selçuk Candan. The undesired phenomenon of topic drifting leads to the building of concept vectors containing errors: for example, topic drifting could lead to the generation of a vector for the Turin concept wherein the weight of the dimension Turin is less than the weight of the dimension Piedmont.

Thanks to experimental tests, the Applicant noted that the phenomenon of topic drifting occurred (and happened in a way that was more and more evident) as the iterations of the propagation algorithm increased. According to this third form of implementation of the concept propagation method, given a parent node $n_{par}$, having k children, the propagation coefficients are given from the following expression:

$$\alpha_{child_i \rightarrow par} = 1/(k \cdot \text{num\_iteration}) \quad (9)$$

the propagation coefficient is inversely proportional to the number of children nodes and the number of the iteration.

It is believed that this choice of the method for calculating the propagation coefficients permits to increase the effect of propagating the keys in the first iterations, which are those that associate with a node the information derived from those closest to it, and resizing the effect of the final propagations, which capture semantic aspects derived from concepts that are far in the hierarchical structure.

Figure 5:
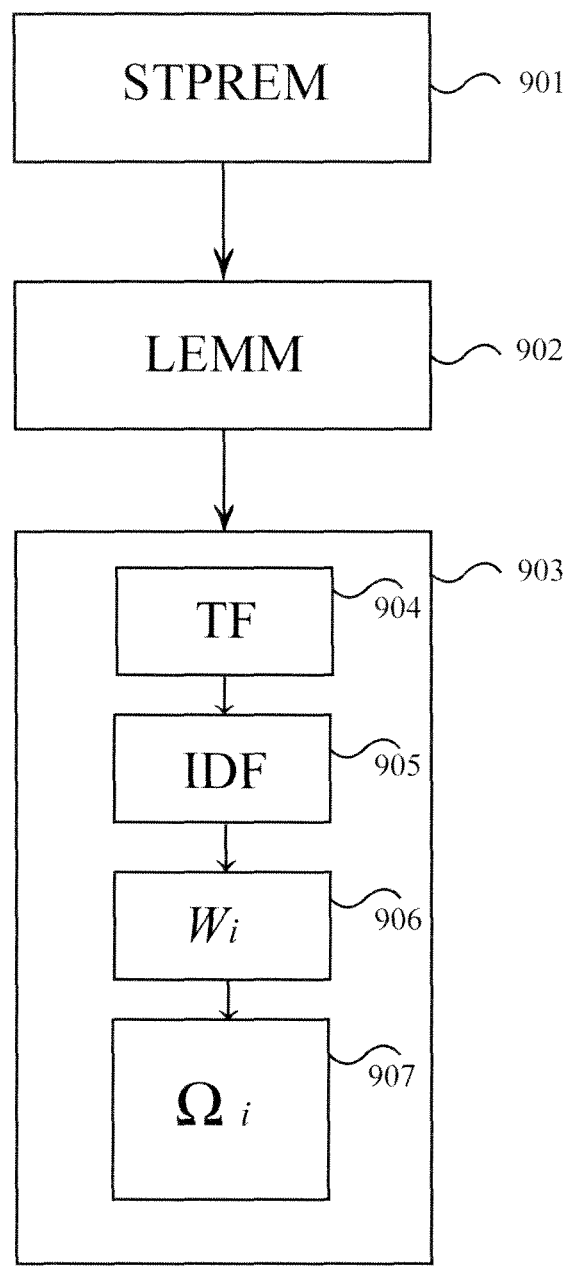

Example of Implementation of Generation Steps 302 and 304 of the Second and Third Keyword Vectors FIG. 5 shows a flow chart 900 representing a particular embodiment of the generation step 304 of the third keyword vectors and comprises the following steps: stopword removal 901 (STPREM), lemmatization 902 (LEMM) and vector representation 903. As has already been stated, generation step 304 is based on the text descriptors 400 of the contents. Observe that hereinafter reference will be made to generation step 304 relative to the keyword vectors associated with contents 400, but a similar methodology can also be used for generation step 302 of the second keyword vectors obtained from the texts associated with the context documents 600.

In a greater detail, the stopword removal step 901 selects and removes from the content descriptors 400 those terms that recur in a language so constantly and so frequently that they can be considered to be lacking in information during the development of automatic systems for text research. Typically, the stopwords as a whole contain articles, prepositions and pronominal particles, but also common verbs such as "do/make," "go," and so on. It is possible to use a standard list of stopwords for the Italian language that may be found, for example, on the Web page: http://members.unine.ch/jacques.savoy/clef/italianST.txt. The stopword removal 901 from the content descriptors serves to maximize the quantity of useful information in the resulting vectors. If $C_i$ is the set of terms contained inside a content descriptor i, and S the set of stopwords for the language in question, the stopword removal process creates a new set of terms $D_i$ for the concept descriptor such that $$D_i = C_i - S.$$

$$D_i = C_i - S$$

Lemmatization 902 includes that operations that lead to the joining of all the for us under the respective headword (i.e. the lemma), meaning by headword each title word or keyword of a dictionary and by form each possible different graphic realization of a headword. Lemmatization 902 allows attributing variants or inflections to the same word, which serves as a headword. These variants are the forms of the headword.

Examples of the forms are: I will eat, we would eat, you ate, you eat: the headword to which each of these forms is reducible is "to eat" (that is, the word as it appears in a dictionary). It is a convention of the Italian language that the verbal headword is represented by the conjugated form to the active infinitive present. According to an example relative to the Italian language, a vocabulary of headwords available at http://sslmitdev-online.sslmit.unibo.it/linguistics/morph-it.php can be used.

If p is the word to be entered as a headword and l the reference headword for p, the lemmatization is a non-invertible function $f_L$ such that: $f_L(p) = 1$. In the vector representation 903, each considered descriptor will be represented by a vector inside the space of the keywords. The keyword is one of the terms belonging to the descriptor set of terms, down from the stopword removal 901 and lemmatization 902 steps. If $C_i$ is the set of terms contained within a descriptor of a content i, and S the set of stopwords for the considered language, and $f_L$ the lemmatization function. A keyword k is defined $$k = f_L(p) : p \in D_i \text{ where } D_i = C_i - S \quad (10)$$

In the representation step 903, each keyword of a content descriptor 400 is associated with a weight that represents the value that the component of the space associated with that word assumes. Preferably, representation step 903 is performed by applying the Term Frequency-Inverse Document Frequency (TF-IDF) method. According to the TF-IDF method, the weight of a keyword is calculated in terms of the frequency internal to the content descriptor and the inverse frequency in the set of descriptors: this methodology allows making by-weight calculations taking into account the relevance of the keyword in a single text. Specifically, the Term Frequency-Inverse Document Frequency method includes a calculation step 904 of a TF factor (Term Frequency) and a calculation step 905 of an IDF factor (Inverse Document Frequency).

With reference to the TF factor, if $P_i$ is the set of keywords contained in the content descriptor, the TF factor for a keyword $k \in P_i$ is defined as the normalized internal frequency (that is, the ratio between the number of occurrences $n_k$ of the same word in the content descriptor and the sum of occurrences $n_j$ of the words present in the descriptor):

$$TF_i(k) = \frac{n_k}{\sum_j n_j} j \in P_i \qquad (11)$$

The TF factor gives a measure of how effectively that term describes the document content. Intuitively, the terms that most frequently appear within a document describe better its content. With reference to the IDF factor, let N be the total number of documents in a collection, and $d_k$ the number of documents wherein the keyword k appears. The IDF factor for the keyword k is defined as the logarithm of the relationship between N and $d_k$:

$$IDF(k) = \log\left(\frac{N}{d_k}\right) \qquad (12)$$

The IDF factor, which quantifies the inverse of the frequency of a term k among all the documents in the collection, is used to reduce the weight of the less distinctive keywords because they appear many times in different documents.

A weight $w_i$ of any keyword k in the descriptor i is calculated in a step 906 as the product of the TF and IDF factors:

$$w_i(k) = TF_i(k) \times IDF(k) \qquad (13)$$

$$w_i(k) = \frac{n_k}{\sum_j n_j} \times \log\left(\frac{N}{d_k}\right)$$

Each content 400 (that is, each context document descriptor 600) is described through a numeric vector the length of which is equal to the total number of considered keywords. Each value within the vector represents the weight of the keyword associated with that dimension in the space for the content. If P is the set of all the keywords of the contents collection, a keyword vector $\Omega_i$ associated with the content i is defined in a step 907 as:

$$\Omega_i = [w_i(k_1), w_i(k_2), \Lambda, w_i(k_m)] \; k_1, k_2, K, k_m \in P \qquad (14).$$

Example of Implementation of the Enrichment Step 303

Figure 6:
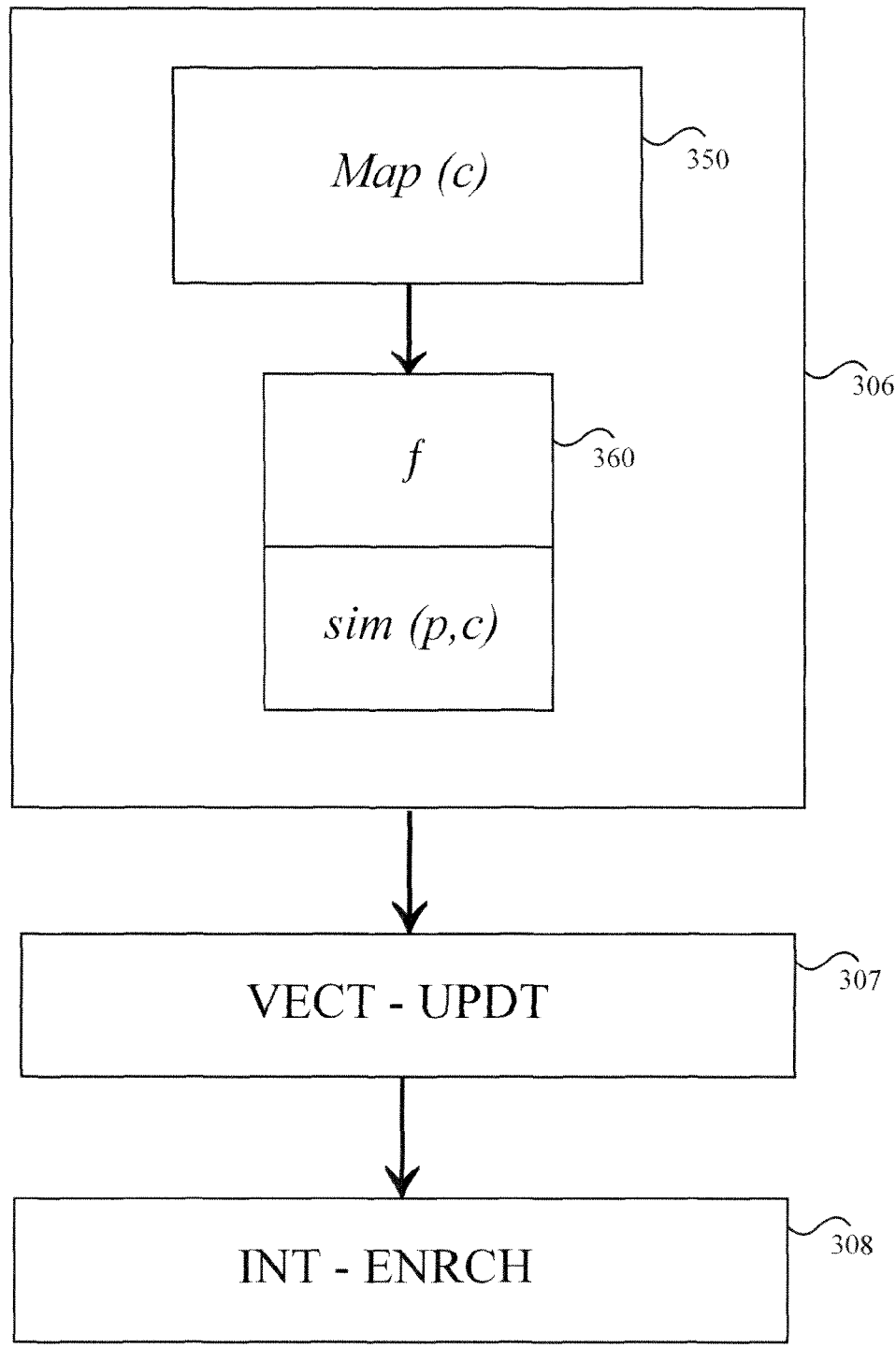

As already mentioned, according to an exemplary embodiment, the enrichment step 303 includes classification step 306 of the context documents in the taxonomy nodes of the cinematic genres domain 500 and, preferably, also of one of the other considered domains also such as, for example, the geographic domain 501. Furthermore, the enrichment step 303 includes a keyword selection step 307. The classification step 306 allows the association of each context document 600 with an information relative to its collocation inside one or more concepts contained in the domain taxonomy 500. Classification 306 therefore leads to the association of one or more concepts present in a given taxonomy 500 with the content (in this case, the context document) to be classified. FIG. 6 shows a flow chart that illustrates one embodiment of the enrichment step 303.

In general, the keyword vectors are inside the keyword space $P = Y_{P_i} \forall i$, while the concept vectors are inside the vector space of concepts CS. In accordance with the example pertaining to the cinematic genres domain 500 herein considered, the classification step 306 includes a mapping step 350 of the concept space of the cinematic genres domain taxonomy 500 on the keyword space. This mapping 350 associates to each dimension of the concept space one or more dimension of the keyword space.

Mapping step 350 can be implemented through a mapping function map. Given the concept space CS and the keyword space P, the mapping function map of the concept space on the keyword space is a function defined as follows:

$$\mathrm{map}(c) = \{p : p \in P\} \text{ con } c \in CS \qquad (15)$$

such that the meaning of c and p of the language used is the same.

Advantageously, the mapping function map of the concept space on the keyword space identifies the congruity of meaning through the verification of the representation of the labels associated with the different dimension. In other words, it is assumed that the congruity of meaning is associated to the representation of the string in the used language. That is, in mapping step 350 the taxonomy concepts 501 are associated with keywords that correspond to the labels of each concept, expressed in the chosen language.

Furthermore, classification step 306 includes a step 360 of application of a classification function $f_c$ to the third keywords vectors $\Omega 3$ associated with the context documents 400 and to the keyword vectors obtained in the mapping step 350, which share the vector space. The application of the classification function $f_c$ permits an association between context documents and concepts. If C is the set of contents (such as the context documents 400) considered and D the set of concepts belonging to a domain (such as the cinematic genres domain 500), if s is a threshold numeric value, the classification function is a function $f_c$:

$$f_c(p) = \begin{cases} sim(c, p) & \text{if } sim(c, p) > s \\ 0 & \text{otherwise} \end{cases} \qquad (16)$$

$$\forall p \in C, \forall c \in D$$

The classification function $f_c$ will assume a value different from zero if a similarity function sim between a content p and a concept c is higher than the threshold s, and will be null if not. For each concept c the set of classified contents M, for which the classification function is not null, that is:

$$M_c = \{p : f_c(p) \neq 0\}$$

is called an extension of the concept c.

Given the content p and the concept c, and the respective vectors $\Omega_p$ and $\Omega_c$, the similarity is calculated as a normalized scalar product of the two vectors $\Omega_p$ and $\Omega_c$, that is to say as the cosine of the angle between two vectors of the common space:

$$sim(c, p) = \cos\theta_{\Omega_c,\Omega_p} = \frac{\Omega_c \cdot \Omega_p}{|\Omega_c| \cdot |\Omega_p|} \quad (17)$$

The similarity function sim expresses how much a content and a concept represented by the two vectors $\Omega_p$ and $\Omega_c$ resemble each other, evaluating the angle that they form, and allows verification of whether or not each context document belongs to the extensions of the taxonomy concept, or in order to associate to each concept the documents that are most relevant for that concept.

At the end of classification step 306, each concept inside the used taxonomies has an extension M which may be empty, or may contain part of the contents used for the definition of the context. In other words, the result is a situation wherein each concept within taxonomy 500 represents a "category" inside which a subset of the chosen context documents for the context may be found. Each document may appear in the extension of several concepts.

With reference to the selection step 307 of representative context words. This step 307 has the purpose of selecting for each concept the significant keywords that can enrich its semantics, or the associated vector. These terms are selected within the context documents present in the extension of that concept. Specifically, in order to perform the selection step 307, it is possible to use techniques that are borrowed from the information retrieval fields, adapted to the specific domain of application. In particular, it has been observed that the techniques of "readjustment of weights in probabilistic relevance feedback" that are described in the above-cited paper by Jinxi Xu and W. Bruce Croft, "Query Expansion Using Local and Global Document Analysis" may be applied.

In this case, the technique of readjustment of weights is adapted to the specific situation by revisiting the selection problem for the enrichment purpose, as indicated below. According to this approach, the keyword vectors associated with the concepts of the taxonomy will be updated (updating step VECT-UPDT of FIG. 6). Recall that the problem of enrichment of the term concepts is the following: given a set of concepts C, and given the relative extensions with regard to a set of documents D, update the keyword vectors associated with the concepts in such a way as to reflect the significance of the terms present in the vectors of the documents present in the corresponding extensions.

Revisiting this problem from the relevance feedback viewpoint is the following:

interpreting each concept vector as a query to a document database, and the extension of the concept as the set of documents returned by the system when confronted with the query, and recognized by the user as relevant;

carry out a modification or "readjustment" of the terms of the query (and therefore of the concept vector) in order to take into account the weights of the terms present in the documents already returned by the system and recognized by the user as relevant (and therefore in the extension of the concept).

Figure 7:
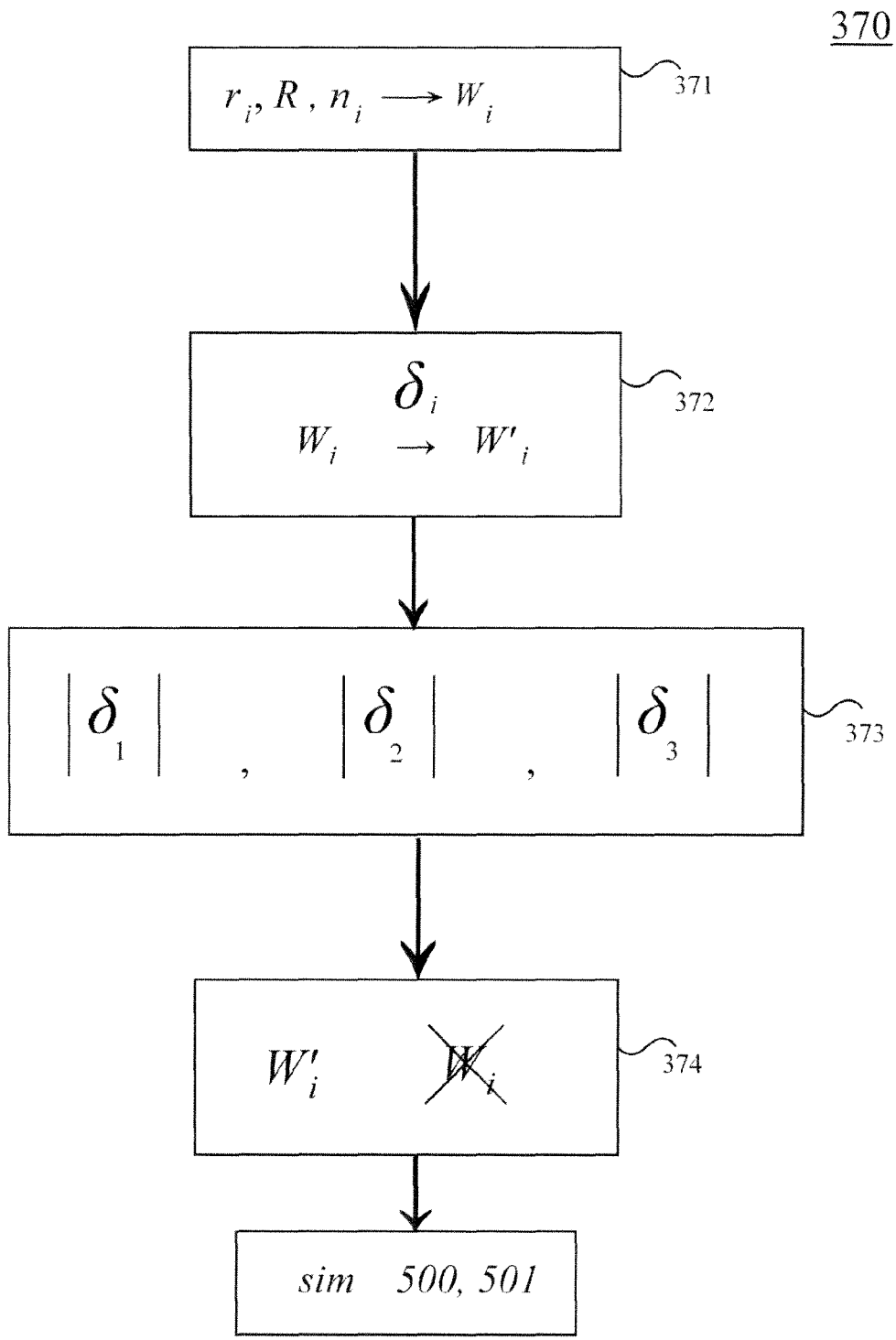
FIG. 7, using a flow chart, shows an embodiment specific for one step of selection of keywords of text documents.

Reference is made, by way of example, to the flow chart in FIG. 7 that shows a specific embodiment 370 of the selection step 307, in accordance with the probabilistic relevance feedback method. FIG. 7 shows a readjustment step 371 of the weights of the concept vectors (query) that comprises the application of the following formula:

$$w'_i = \log\frac{r_i/(R-r_i)}{(n_i - r_i)/(N - n_i - R + r_i)} \times \left(\frac{r_i}{R} - \frac{n_i - r_i}{N - R}\right) \quad (18)$$

wherein:

$w'_i$ is the new weight assigned to the $i^{th}$ keyword associated with each concept (corresponding, to the $i^{th}$ term in the query);

$r_i$ is the number of context documents present in the extension of the considered concept and containing the $i^{th}$ keyword (corresponding to the number of documents in the query results containing the $i^{th}$ term);

$n_i$ is the number of documents wherein the $i^{th}$ keyword is present, in the data collection under any concept;

R is the number of relevant documents for the concept in question (corresponding to the number of concept extracted from the query);

N is the number of context documents present in the collection.

Formula (18) allows finding those words that characterize a particular concept since they are words present in the concept extension but are rarely present in other concept. By applying the preceding formula (18), one can calculate the weight that the singular keywords (both those initially present in the vector—keywords—and those present only in the extension documents having initially a null weight in the corresponding vector) will assume after the enrichment step. The parameters ri, ni and R can be evaluated, i.e. counted, by the processor 101 from the available data collection.

The variations in weight due to this process may be more or less significant. For example, it is possible to proceed in such a way that the enrichment process will incorporate the variations in the query (or, in the keyword vector corresponding to the considered concept) so as to guarantee to them the conservation of energy (defined as the sum of the weights for all the keywords for each concept extension) for a percentage equal to θ=95%. The 95% exemplary value is that accepted as standard in cut-off methods based on the energy conservation, as an expert in the field will acknowledge.

Selection step 370 proceeds according to the following steps. A calculation step 372 is carried out for each keyword $t_i$ (both for those present in the starting query/concept, both for those present only in the documents that appear in the extension after classification step 306) of a difference $\delta_i$ between the weight $w_i$ in the vector representing the concept (a weight equal to zero for the keys absent from the concept space) and the corresponding new weight $w'_i$ computed by the feedback formula described above.

In a reordering step 373, the keywords are ordered on the basis of the decreasing value of the corresponding increases $\delta_i$, into the absolute value: $|\delta_1|, |\delta_2|, |\delta_3|$. In an updating step 374, the weights corresponding to the k terms with the greatest variations by weight $\delta_j$ are updated (that is, replaced) in such a way as to guarantee the conservation of 95% of the energy, that is, choosing the minimum k for which the following equation applies $$\sum_{j=1}^{k} \delta_j \geq 0.95 \cdot \sum_{j=1}^{n} \delta_j$$

At the end of this updating step 374, the enrichment is reflected on the entire domain taxonomy 500 through the reiteration of the propagation process above described.

Therefore, in accordance with the embodiment of FIG. 7, the keyword selection step 370 permits the association of the taxonomy of the cinematic genres domain 500 only with those keywords derived from context documents 600 which have a greater relevance, ignoring those keywords that affect less such as, for example, those that affect less than 5%. The criterion for selecting keywords is based on parameters indicative of how much the keyword occurs in the considered documents and vectors, resulting more or less statistically relevant.

With further reference to FIG. 6, the enrichment integration step 308 (INT-ENRCH) is performed to complete the enrichment, after the selection step 307. According to the described example, the enrichment integration step 308 integrates the selected keywords into the concepts vector associated with the taxonomy by assigning suitable weights. An embodiment of said enrichment integration step 308 will be described below by illustrating a method of determining the weights to associate with the keywords.

A generic concepts vector cv is defined. Three different subsets X, Y and Z of the starting set of context documents 600 are determined and associated with the concepts vector cv.

1. the set X includes all the context documents that shows higher similarity to the concepts vector cv, when the database is queried using vector cv as a query; i.e. starting from a concept the context documents which are more similar to the said concept are chosen by using a classification function analogous to the one of formula (16) but modified to show concepts vectors instead of keywords as arguments of the classification function;
2. Y is the set of context documents which have been associated with concepts vector cv in the classification step 306; it is observed that set Y can be considered the best subset of context documents representing a concept;
3. Z is the set of documents retrieved by querying the database employing only keywords selected as relevant in the selection step 307 based on significance computing;

Under a theoretical point of view the enrichment integration step 308 determines the keywords vector associated with a concept vector basing on a comparison of sets X and Z with respect to set Y. As an example, in case that set X covers a significant portion of set Y, while set X covers only a limited portion of f set Y, the final enriched vector will derive from keywords taken mostly from context documents belonging to set X and only in a reduced amount from set Z.

In greater detail, the following intersection sets and the corresponding cardinalities are determined:

D=X∩Y∩Z, having cardinality d
A=(X∩Z)−D, having cardinality a
B=(X∩Y)−D, having cardinality b
C=(Y∩Z)−D, having cardinality c Cardinality b+d refers to the X∩Y set consisting of documents resulting from both a classification performed starting from concepts and the classification 306 performed starting from context documents. Cardinality c+d refers to the Y∩Z set consisting of documents retrieved from both a classification starting from the vector created with terms resulting from selection step 307 (which are relevant for the concept) and the classification step 306 performed starting from documents.

Furthermore, the following vectors are defined:
an initial concept vector $cv_0$, i.e. a keywords vector associated with a concept deriving from the generation step 301 of the first keyword vectors Ω1 (FIG. 1);
an initial keywords vector $rk_0$, i.e. a vector of "candidate" keywords resulting from the selection step 307 and deriving from context documents;
an enriched vector ev.

The enriched vector ev is obtained from a vectorial sum step:

$$ev = \alpha \cdot cv_0 \oplus \beta \cdot rk_0 = cv_1 \oplus rk_1$$

wherein $$cv_1 = \alpha \cdot cv_0 \text{ and } rk_1 = \beta \cdot rk_0$$

αeβ are scalar factors which can be computed as indicated below. Therefore, the enriched vector is expressed by a vectorial sum of the initial concept vector $cv_0$ multiplied for the factor α which indicates its statistical relevance and the initial candidate keywords vector $rk_0$ multiplied for the factor β which indicates its statistical relevance. From the above definitions, it is clear that the rate:

$$\frac{b+d}{c+d} \tag{18a}$$

reflects the significance degree of the initial concept vector $cv_0$ and the initial candidate keywords vector $rk_0$. In the enrichment integration step 308 this reciprocal relation between vectors $cv_0$ ed $rk_0$ is maintained thanks to factors α and β, chosen is such a way that the following conditions are satisfied:

$$\text{length}(cv_1 \oplus rk_1) = 1 \tag{18b}$$

(i.e. the length of the vector resulting from the integration is 1; where the length is the sum of all the vector components) and $$\frac{\text{length}(cv_1)}{\text{length}(rk_1)} = \frac{b+d}{c+d} \tag{18c}$$

The lengths of vectors $cv_0$ and $rk_0$ equal to 1:

$$\text{length}(cv_1) = \alpha \cdot \text{length}(cv_0) = \alpha \cdot 1 = \alpha$$

$$\text{length}(rk_1) = \beta \cdot \text{length}(rk_0) = \beta \cdot 1 = \beta$$

Replacing the above expression into relations (18b) and (18c) the following is obtained:

$$\begin{cases} \text{length}(cv_1 \oplus rk_1) = \alpha + \beta = 1 \\ \frac{\text{length}(cv_1)}{\text{length}(rk_1)} = \frac{\alpha}{\beta} = \frac{b+d}{c+d} \end{cases}$$

By solving the above system the following expressions of factors α and β are found:

$$\alpha = \frac{b+d}{b+c+2d} \text{ and } \beta = \frac{c+d}{b+c+2d}$$

Then, factors α and β are obtained from the cardinalities b, d and c defined above.

Enrichment step 303 can also be advantageously performed to enrich the other domains considered, such as the geographic domain 501 and not only the cinematic one 500. Thus when concepts belonging to different taxonomies are enriched in the way described above, they are described by a new concept vector, as in the relationship (1). Also advantageously provided is a step of similarity calculation 375 (FIG. 7) between concepts belonging to different domains. As an example, for similarity calculation 375, the same function sim can be employed, expressed by the relation (17) defined above, to keyword vectors, as a result of the enrichment and associated with the cinematic genres 500 and geographic 501 domains. This advantageously allows to link (creating new arcs between the concept nodes of the most similar of different taxonomies) concepts that were initially disjoint, overriding the simple hierarchical structure of the domains that was supplied in input. The determination of such links or relations (called latent relations) can be performed by the module of latent relation determination 208 (FIG. 1). Such relations can be used during the exploration of concepts (categories) or of the contents classified in them. Extraction of the latent relations between concepts and their use in the restructuration of domain taxonomies represent an extremely advantageous aspect.

With reference to this latent relations and in accordance with an exemplary situation already considered, after the enrichment 303 selected keywords from newspaper articles (i.e. the context document 600) which refer to Torino and the Mole Antonelliana are associated with the taxonomies of domains 500 and 501. Therefore, the concept TORINO thanks to the fact that includes also the label MOLE ANTONELLIANA, can be linked to the further taxonomy of the artists and to the concept ANTONELLI (where Antonelli is the surname of an artist).

Example of Implementation of Classification Step 305 of Contents 400

In accordance with the considered example, the classification step of contents 305 is based on:

the keyword vectors representative of the taxonomies of domains 500 and 501 as resulting from enrichment step 303 and, advantageously, as resulting from the similarity calculation step 375 which, allow to explicit the latent relations between vectors;

the third key vectors Ω3 relative to the descriptors of content 400, such as, for example, the descriptors of cinematic content, as obtained from generation step 304.

It is noticed that, for the purposes of content classification 305, information relating to the classification made in step 306, which created a relation between the context documents 600 with the first keyword vectors Ω1 relative to the cinematic genres domain taxonomy 501, is not used. The classification of the newspaper articles (that is, the context documents 600) in the taxonomy of cinematic genres domain 501 is useful for the purposes of enrichment but may not have any interest for the purposes of classification on content 400. In other words, the concepts belonging to the domain taxonomies 500 and 501, enriched as described above, have an extension to which belong the contents 600 for the context description. This extension, used for enrichment purposes, can be disregarded for the purposes of classification step 303 of content 400. For example, the information that links a specific newspaper article to a given label of the cinematic genres taxonomy can be disregarded.

The classification step 305 of content 400 includes, preferably, a further mapping step analogously to what was done for the context documents and a classification function $f_c$ expressed by the formula (16) is used. This allows construction of a hierarchical catalog of concepts (or categories), associated with which are sets of content with a uniform semantics, which can be stored in database 103 (FIG. 1). The resulting catalog, stored in database 103, contains data and/or information (such as, for example, indexes or pointers) that relate concepts, keywords and contents in accordance with the results obtained by the methodology.

It is noticed that classification method 300 described herein, also allows a supply of new contents 400 and/or context documents 600 at the same time with a dynamic reclassification of the contents that follows the new relationships that have emerged. By way of example, see the abundant set of films which, since 2001, use the topic of the September 11 tragedy. These films, classified in the nodes of the selected taxonomies, would characterize their structure and meaning, allowing one, for example, to associate terms such as "9/11," "twin towers," "terrorism," etc., to the "New York" node.

The catalogue's capacity to reflect, in time, context changes through accumulated knowledge makes the present invention particularly advantageous, since the classification adapts itself to the implicit knowledge that people have of the objects that populate the world. Furthermore, making explicit the latent relationships between the concepts of the domain adds a further element of enrichment to the content organization and facilitates the experience of serendipity during the research. The catalog thus created allows a content and category organization closely associated with the one made by people, therefore easier to navigate, consult, and access.

Alternative Classification Methods

Below is described an alternative method of classification besides the techniques and algorithms described with reference to the mapping steps 350 (FIG. 6) and application of a classification function 360, like those included in the classification step of context documents 306. The alternative classification method described below can be employed for the classification of the context documents 600 and the classification of contents 400 as an alternative to the step 305 described above and for the determination of the set X described with reference the enrichment integration step 308.

The mapping step 350 previously described performs the mapping of each concept c within the keyword space (of the contents or the context documents), while the alternative mapping mode employs a complementary approach, that is, the mapping of each document in the concept space C. According to this approach, another classification function f' will be used.

Let C be the set of the considered concepts and D the set of documents to be classified. The alternative classification function is a function $f':C \times D \rightarrow \Re$ that, given a concept c and a document d, returns the real number that quantifies the "degree of membership" of document d to the class denoted by concept c. The alternative classification function assumes a null value $f'(c,d)=0$ in cases where the considered document has nothing in common with the characterization of the class associated with c. The classification function thus defined is total, in the sense that it returns the degree of membership of each document, with regard to each concept in the considered space and shows a form analogous to the ones described by formulas (16) and (17).

Aiming to associate each document with a subset of concepts, those that best represent it, it is necessary to define appropriate thresholds for the values returned by the classification function, and to define the extension of each concept (that is, the set of documents classified in the corresponding class) starting from that threshold. According to this alternative embodiment of classification, to define the extension of the concepts, it is applied an analogy with whatever happens for the definition of the results of the query in information retrieval.

Specifically, the method adopted provides that:

the classification process of a document d is treated as thought it were dealing with a query, wherein d represents exactly the query, and the concepts in the given space constitute the database from which information is obtained for the returning of the results;

each document d corresponds to a query, which returns the best $k_d$ concepts that represent it. The $k_d$ value depends on the specific document (also on the concept space), and it is calculated using the cut-off algorithm described below;

the value of the function f'(c,d), that is the degree of membership, is calculated by using the metric of the cosine of the angle between the vector of the document and the vector of keywords that represents the concept in the corresponding taxonomy, after the application of the CP/CV method. It is noticed that, depending on the rereading of the document to be classified in terms of "query" compared with querying the concept database, for classification purpose, the keyword vectors of the articles of the context have been preprocessed in a way similar to that described with reference to the step of stopword removal 901, lemmatization 902 and vector representation 903. Specifically, for this purpose the individual vector component, that is, the weights, represent the measure of "normalized frequency of terms," $n_{tf}$, defined as follows:

$$ntf = 0.5 + 0.5 \frac{TF}{max\_TF}$$

Wherein TF is the already-defined factor Term Frequency Note that the IDF factor (Inverse Document Frequency) introduced in calculation step 905 and commonly used in the definition of weights of the individual keys in the vectors representative of text documents is in this case eliminated. Note that in the case of the vectors that represent queries, the weight of each keyword is actually independent of the frequency with which that word occurs in other queries.

Example of an Additional Cut-Off Step of the Classification

Both the classification described with reference to step 306 and FIG. 6 and that described in the previous paragraph with reference to an alternative form can also include an additional cut-off step of classification. This algorithm establishes a criterion to determine a number of most significant concepts and thus avoid classification regarding the other concepts. In a greater detail, given a document d and a set of concepts C={c1, c2, . . . , cn} regarding to which d should be classified, the cut-off algorithm has the purpose of identifying the number k of the "most significant" concepts with respect to which d can be classified, and associate a null default value 0 to the classification function relative to the remaining n-k concepts.

Figure 8:
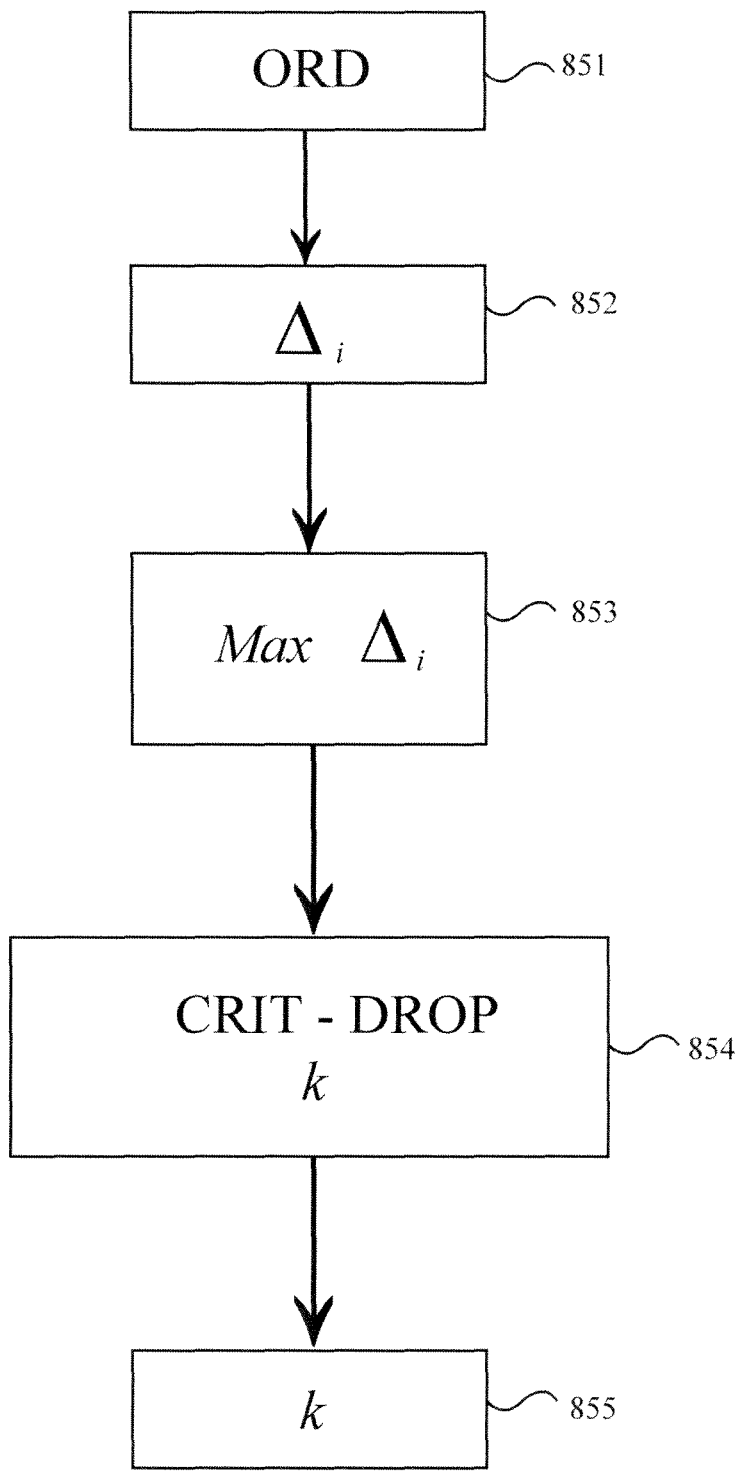
FIG. 8 shows a flow chart that illustrates a particular method of cutting-off one step of classification within a taxonomy.
Figure 9:
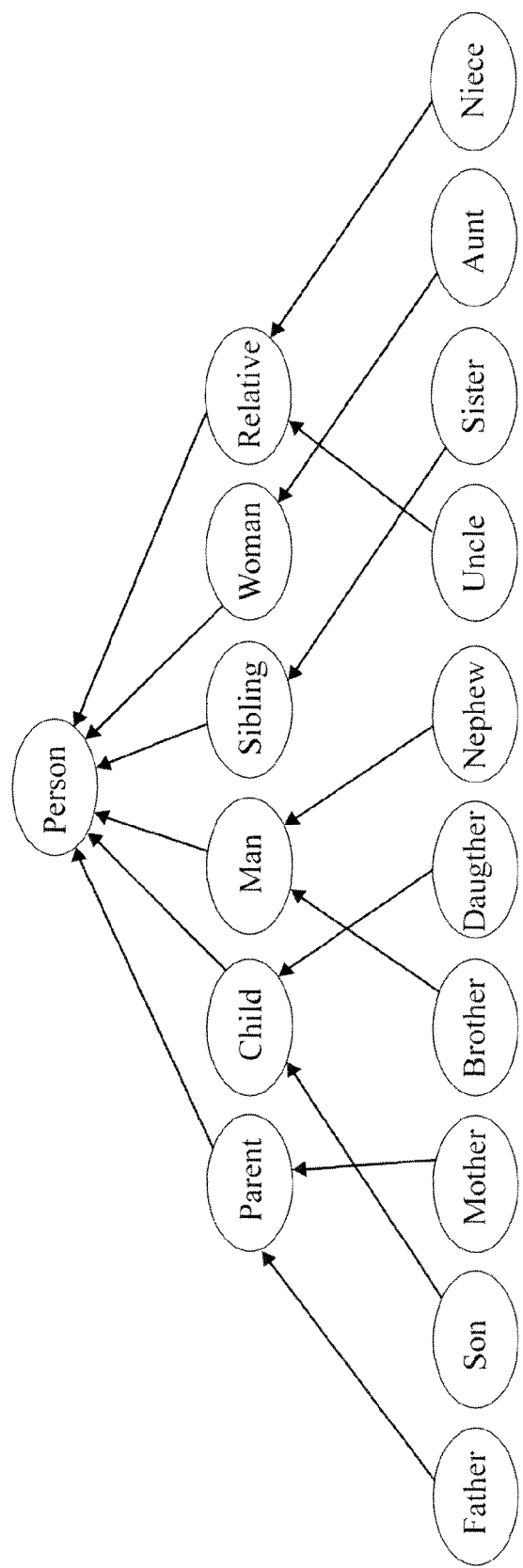
FIG. 9 shows, by way of example, a taxonomy of generic family relationships.

Refer to the flow chart in FIG. 8, which represents some steps of the cut-off algorithm 850. The cut-off algorithm 850 includes an ordering step 851 (ORD) wherein the similarity values are ordered according to a decreasing order and a calculation step 852 of the differences of adjacent values Δi, in the sequence returned by ordering step 851. Also, the cut-off algorithm 850 includes a determination step 853 of the maximum Max of the difference values calculated in step 852.

The cut-off algorithm 850 also provides a calculation step 854 of a value for average drop (AV-DROP), that is, the average of all the differences that precede the point of maximum drop. The point of maximum drop is the point at which the maximum difference between one value and the one succeeding occurred. In another calculation step 854, a critical drop value (CRIT-DROP) is assessed, that is, the first difference value greater than the average drop, in the sequence obtained from step 852. In a step 855, an assessment of index k is performed, which corresponds to the calculated critical drop point.

Note that the sequence returned by ordering step 851 of the algorithm contains:

(a) concepts corresponding to terms (keywords) present in the document to be classified, and (b) concepts corresponding to terms not present in the document to be classified, but which are recognized as pertinent (similar) by way of the propagation of weights corresponding to the other concepts in the hierarchy.

The cut-off algorithm 850 is applied only to subsequence (b), aiming however to restore as relevant all the concepts associated with the terms present in the query.

Referring to the alternative mode of classification, the following definition of "extension of concept" and the subsequent observations described here below are useful. Given the sets C of the concepts present in the initial taxonomy, and D of the documents to be classified, the extension of a concept c ∈ C compared to D is the set $$E(c,D)=\{d \in D | f'(c,d) > 0\}$$

Note that:

each document may appear in the extension of several concepts. Specifically, it appears in the extension of all the concepts denoted by keys present in the document itself, besides those identified by the cut-off algorithm.

it is possible that certain documents do not appear in any concept extension, in the case where the vocabularies associated with two spaces are disjoint; the extensions of the concepts may be empty.

The Concept Propagation Method

In this section the theoretical bases of the concept propagation method will be indicated.

Semantics Associated with Concept Vectors

According to the method described, in the taxonomies the proportion of the contribution made by one concept to the definition of another concept in the taxonomy is evaluated by comparing them and quantifying their relative relationships of generality and specialization. Proportioning of these relationships takes place with attention to the following observations:

the concept associated with a more general node with respect to the hierarchy subsumes those associated with its descendants (for example, the node ITALY conceptually covers all its descending nodes: TURIN, MILAN, ROME, . . . that is, when reference is made to TURIN, reference is implicitly made also to ITALY);

the concepts subsumed by sibling nodes (that is, nodes associated to the same parent node) are usually disjoint. Consequently, the relations existing between siblings are completely captured through those existing with the parents (that means that the node TURIN identifies a concept different from MILAN, ROME, etc., but among them the cities have in common the fact that they all belong to ITALY).

To measure the aspects linked to the degree of generalization, refer to a level of coverage of the individual concepts, or the percentage of elements of the domain that those concepts represent. Generally, associated with each node is a level of coverage in the interval [0,1], by associating the level of coverage 1 with the taxonomy root, which subsumes all the other nodes. Furthermore, it is guaranteed that an interval (range) associated with each parent node covers the one associated with the union of its children (considering that each parent concept subsumes all its children), and that in descending toward the lowest levels of the hierarchy, the ranges of coverage are reduced (in consideration of the fact that the nodes at the lowest level represent more specific concepts).

The interval (range) associated with a concept indicates the level of coverage of a concept compared to the concepts that it subsumes. The size of the ranges associated with individual concepts, denoted by share($v_j$) (where $v_j$ is a node of the hierarchy) are defined recursively, as follows:

$$\text{share}(v_j) = \begin{cases} 1.0 & \text{if } v_j \text{ is the root} \\ \text{share}(v_p) \times \dfrac{1}{\text{num\_children}(v_p)} & \text{otherwise} \end{cases} \quad (19)$$

In the formula (20) $v_p$ is the parent node of $v_j$ in the hierarchy and num_children ($v_p$) is the number of children nodes of $v_p$.

The "share" concept associated with a node is at the base of the measure of the reciprocal degree of generalization/specialization between two nodes inside a given taxonomy, with respect to its structure. It is useful to define a degree of generalization of one node compared with another. If $v_i$ and $v_j$ are two nodes inside a given taxonomy, and if $v_i$ is an ancestor of $v_j$, share($v_i$) and share($v_j$) are the size of the ranges associated with the corresponding concepts. The degree of structural generalization of the node $v_i$ compared to node $v_j$ is defined as:

$$G^{str}_{v_i,v_j} = \frac{\text{share}(v_i)}{\text{share}(v_j)} \quad (20)$$

The objective of the algorithm for concept propagation is to associate with each node in the taxonomy a concept vector $\Omega_{v_j} = \lfloor w_j(v_1), w_j(v_2), \Lambda, w_j(v_m) \rfloor$, so as to guarantee the conservation of the reciprocal relationships of generalization/specialization between the nodes. That is, one wants to guarantee the possibility of measuring the reciprocal degree of generalization/specialization between two concepts (associated with nodes inside a hierarchy, operating directly, using an appropriate metric, on the two corresponding vectors associated with those nodes of the taxonomy. The vectors will be compared "in isolation," without making reference directly to the position of the corresponding nodes in the hierarchy, and the weights associated with the individual components must make the information relating to the position explicit inside the initial structure of the corresponding concepts.

To define a comparison metric of the generality/specificity of concept vectors, refer to the contribution that the individual components of the vector make to the definition of the corresponding concept. Specifically, being more or less general in terms could mean being more or less limited. A very general class, represented by a concept vector, can be interpreted as a set of elements each of which satisfies at least one of the concepts present in the corresponding vector. In logical terms, a general class can be represented through the disjunction of the concepts starting from which it is defined.

The origin O=[0,$\Lambda$,0] of the concept space CS can be interpreted as representing the class wherein none of the properties characterizing the concepts $c_1,\Lambda,c_m$ at the base of the space is satisfied. Logically, the origin can be interpreted as ($\neg c_1 \wedge \neg c_2 \wedge \Lambda \wedge \neg c_m$), or, in an equivalent way, as $\neg(c_1 \vee c_2 \vee \Lambda \vee c_m)$, that is, as the negation of the disjunction of the properties of the concepts that characterize the space.

As the distance from the origin increases, also increases—according to this interpretation—the "distance of the negation from the disjunction," or—in a dual way—increases the proximity of the disjunction. Given a vector $\omega$, one can thus interpret its distance from the origin $|\omega - O|$ (and thus the length of the vector, $|\omega|$), as the measure of how much the vector represents a disjunction, and thus how general the vector is.

It is also useful to define the degree of generalization in the concept space. The degree of generalization of a vector $\omega_{v_i}$ compared to another $\omega_{v_j}$, the size of which (or, its non-null components) are a subset of the size of $\omega_{v_j}$, is the reciprocal degree of generalization in the concept space. This is defined as a relationship of the respective lengths (which, in turn, represent the extent to which the individual vectors represent disjunctions, and thus general concepts):

$$G^{CS}_{v_i,v_j} = \frac{|\omega_{v_i}|}{|\omega_{v_j}|} \quad (21)$$

With regard to the relations (2) and (3) described with reference to the concept propagation method according to the form of implementation 700 (FIG. 3), remember that since, during the propagation, the parent node inherits all the concepts represented in the vector associated with the child, upon the propagation each child node will have all the significant size (that is, not null) in common with the size (significant) of the parent. Their reciprocal degree of generalization can thus be measured in relation with their respective lengths:

$$G^{CS'}_{par,child_i} = G^{str}_{par,child_i} = \frac{|\omega'_{par}|}{|\omega'_{child_i}|} \quad (22)$$

The formula (22) establishes that the degree of generalization inside the concept space coincide with the structural generalization degree, allowing to compute the coefficients $\alpha_{chil \to par}$ and $\alpha_{par \to child}$ used in formulas (2) and (3) to compute the weights of the vectors associated to concepts

The invention claimed is:

1. A processing method for classification of contents in a domain represented through a taxonomy, comprising:
   generating a first digital mathematical representation of a pre-existing version of the taxonomy, wherein the taxonomy represents a hierarchical relationship of elements in a category which includes nodes of specific elements that fall under a node of a broader element, the nodes existing independently of the contents themselves and representing at least one concept;
   generating a second digital mathematical representation of text documents different from said contents and comprising keywords, the text documents including at least one journalistic publication written about the contents;

processing the first and second digital mathematical representation to enrich the taxonomy, from an initial state to an enriched state, by associating keywords of the text documents with the first digital mathematical representation, such that at least one keyword is extracted from one of the text documents to provide a new label to be associated with a node in the enriched taxonomy, wherein the at least one keyword is present in the text documents but not present in the initial taxonomy, and wherein enriching the first digital mathematical representation with keywords of the text documents comprises:

implementing a similarity function in order to classify the context documents to the taxonomy by associating the text documents with concepts of the taxonomy;

selecting representative keywords associated with said context documents to be used for enrichment; and vectorial summing of vectors corresponding to nodes in the taxonomy and vectors of selected keywords associated with the context documents, in accordance with factors taking into account representative statistical significance, to generate enriched vectors for the nodes in the taxonomy;

generating a third digital mathematical representation of the contents from text descriptors of the contents which are separate and different from the text documents and the taxonomy; and processing a first enriched digital mathematical representation and third digital mathematical representation for classifying the contents in the enriched taxonomy, wherein the at least one keyword that is present in the text documents but not present in the initial taxonomy is associated with another keyword within the text documents that is the same as the node in the initial taxonomy, wherein:

said first digital mathematical representation comprises weights indicating a contribution to a node of the taxonomy supplied by a plurality of concepts of the taxonomy, and a plurality of weights for at least one node in the enriched taxonomy is different than a plurality of weights for the same at least one node in the pre-existing version of the taxonomy;

said second digital mathematical representation comprises respective weights associated with keywords of the text documents, each indicating a relevance of a respective keyword;

said third digital mathematical representation comprises additional weights associated with additional keywords of the contents; each indicating a corresponding relevance of a respective additional keyword, and generating the first digital mathematical representation comprises:

defining a propagation matrix by adjacency associated with the taxonomy and representative of contributions of concepts toward other concepts of the taxonomy;

defining a matrix of concept vectors representative of the taxonomy;

defining a matrix of propagation effect depending upon the matrix by adjacency of the matrix of concept vectors; and calculating a matrix representing the taxonomy obtained from the matrix of propagation by adjacency from the matrix of propagation effect and from the matrix of concept vectors.

2. The method according to claim 1, further comprising: storing in a database data representative of said contents and data indicative of the relative classification in the taxonomy.

3. The method according to claim 1, wherein:

generating the first digital mathematical representation comprises generating first keyword vectors representative of concepts of taxonomy;

generating the second digital mathematical representation comprises generating second keyword vectors representative of text documents;

generating the third digital mathematical representation comprises generating third keyword vectors representative of contents to be classified; and enriching the taxonomy comprises processing the first and second keyword vectors in order to associate keywords of the second vectors to concepts of the first vectors.

4. The method according to claim 1, wherein generating the first digital mathematical representation comprises determining said weights by means of an iterative calculation carried out starting from descriptive propagation coefficients of a degree of propagation between concepts of the taxonomy.

5. The method according to claim 1, wherein said matrix of propagation by adjacency is defined by a plurality of propagation coefficients of keys from a child node of a taxonomy to a parent node of the taxonomy.

6. The method according to claim 1, wherein generation of the first digital mathematical representation of the taxonomy comprises application of a concept propagation method.

7. The method according to claim 1, further comprising:

defining at least one further taxonomy;

calculating a respective further digital mathematical representation of said at least one further taxonomy;

processing the first digital mathematical representation and a respective further digital mathematical representation determining semantic relationships between concepts of the taxonomy and said at least a further taxonomy; and implementing a method of content classification to the taxonomy as related to said at least a further taxonomy.

8. The method according to claim 1, wherein:

implementing a similarity function comprises evaluating a scalar product between the vectors corresponding to nodes in the taxonomy and the vectors of selected keywords associated with the context documents.

9. The method according to claim 1, wherein updating first vectors comprises:

interpreting the first vectors as a query to a document database, and an extension of a concept or a set of documents returned by the query and recognized as significant; and updating the first vectors in order to take into account weights of keywords present in documents returned by the query and recognized as significant.

10. The method according to claim 9, wherein updating the first vectors is performed through a relevance feedback method by associating the first keyword vectors with interrogation queries of text documents.

11. The method according to claim 1, wherein content classification processing comprises:

implementing a respective similarity function between the first digital mathematical representation resulting from enrichment and the third digital mathematical representation of the contents.

12. The method according to claim 1, wherein:
said domain comprises one or more of the following domains: cinematic genres, geographical locations, historic events, art, sport, and artists;
said contents are cinematic contents; and
said text documents are newspaper articles.

13. A computer system of classification of contents in a domain represented by means of a taxonomy comprising:
circuitry configured to:
generate a first digital mathematical representation of a pre-existing version of the taxonomy, wherein the taxonomy represents a hierarchical relationship of elements in a category which includes nodes of specific elements that fall under a node of a broader element, the nodes existing independently of the contents themselves and each representing at least one concept;
generate a second digital mathematical representation of text documents different from said contents and comprising keywords, the text documents including at least one journalistic publication written about the contents;
enrich the taxonomy, from an initial state to an enriched state, by processing the first and second digital mathematical representation and associate keywords of the text documents with the taxonomy, such that at least one keyword is extracted from one of the text documents to provide a new label to be associated with a node in the enriched taxonomy, wherein the at least one keyword is present in the text documents but not present in the initial taxonomy, and wherein enriching the first digital mathematical representation with keywords of the text documents comprises:
implementing a similarity function in order to classify the context documents to the taxonomy by associating the text documents with concepts of the taxonomy;
selecting representative keywords associated with said context documents to be used for enrichment; and
vectorial summing of vectors corresponding to nodes in the taxonomy and vectors of selected keywords associated with the context documents, in accordance with factors taking into account representative statistical significance, to generate enriched vectors for the nodes in the taxonomy;
generate a third digital mathematical representation of the contents to be classified from text descriptors of the contents which are separate and different from the text documents and the taxonomy; and
process the first and third digital mathematical representation for classifying the contents in the enriched taxonomy,
wherein the at least one keyword that is present in the text documents but not present in the initial taxonomy is associated with another keyword within the text documents that is the same as the node in the initial taxonomy,
wherein:
said first digital mathematical representation comprises weights indicating a contribution to a node of the taxonomy supplied by a plurality of concepts of the taxonomy, and combination of a plurality of weights for at least one node in the enriched taxonomy is different than a combination of a plurality of weights for the same at least one node in the pre-existing version of the taxonomy based on the generation of the enriched vectors for the nodes in the taxonomy;
said second digital mathematical representation comprises respective weights associated with keywords of the text documents, each indicating a relevance of a respective keyword;
said third digital mathematical representation comprises additional weights associated with additional keywords of the contents; each indicating a corresponding relevance of a respective additional keyword; and
generating the first digital mathematical representation comprises:
defining a propagation matrix by adjacency associated with the taxonomy and representative of contributions of concepts toward other concepts of the taxonomy;
defining a matrix of concept vectors representative of the taxonomy;
defining a matrix of propagation effect depending upon the matrix by adjacency of the matrix of concept vectors; and
calculating a matrix representing the taxonomy obtained from the matrix of propagation by adjacency from the matrix of propagation effect and from the matrix of concept vectors.

14. The system according to claim 13, further comprising:
a database containing data representing said contents and a relative classification thereof, the database being consultable in order to identify at least one content through a link to another content associated with a keyword of said text documents.

15. The system according to claim 13, wherein the circuitry is further configured to:
apply similarity function between the first and second digital mathematical representations in order to classify context documents in said taxonomies; and
select representative keywords associated with said context documents and being used for enrichment.

16. The system according to claim 15 wherein:
the circuitry is configured to:
generate first vectors of keywords representative of concepts of the taxonomy;
generate second keyword vectors representative of concepts of text documents;
enrich the first and second keyword vectors and to associate keywords of the second vectors to concepts of the first vectors; and
generate third keyword vectors representative of contents to be classified.

17. A non-transitory computer readable medium that stores a program, which when executed by a computer, causes the computer to perform a processing method for classification of contents in a domain being represented through a taxonomy, the comprising:
generating a first digital mathematical representation of a pre-existing version of the taxonomy, wherein the taxonomy represents a hierarchical relationship of elements in a category which includes nodes of specific elements that fall under a node of a broader element, the nodes existing independently of the contents themselves and each representing at least one concept;
generating a second digital mathematical representation of text documents different from said contents and comprising keywords, the text documents including at least one journalistic publication written about the contents;

processing the first and second digital mathematical representation to enrich the taxonomy, from an initial state to an enriched state, by associating keywords of the text documents with the first digital mathematical representation, such that at least one keyword is extracted from one of the text documents to provide a new label to be associated with a node in the enriched taxonomy, wherein the at least one keyword is present in the text documents but not present in the initial taxonomy, and wherein enriching the first digital mathematical representation with keywords of the text documents comprises:
  implementing a similarity function in order to classify the context documents to the taxonomy by associating the text documents with concepts of the taxonomy;
  selecting representative keywords associated with said context documents to be used for enrichment; and
  vectorial summing of vectors corresponding to nodes in the taxonomy and vectors of selected keywords associated with the context documents, in accordance with factors taking into account representative statistical significance, to generate enriched vectors for the nodes in the taxonomy;
generating a third digital mathematical representation of the contents from text descriptors of the contents which are separate and different from the text documents and the taxonomy; and
processing a first enriched digital mathematical representation and third digital mathematical representation for classifying the contents in the enriched taxonomy,
wherein the at least one keyword that is present in the text documents but not present in the initial taxonomy is associated with another keyword within the text documents that is the same as the node in the initial taxonomy,
said first digital mathematical representation comprises weights indicating a contribution to a node of the taxonomy supplied by a plurality of concepts of the taxonomy, and combination of a plurality of weights for at least one node in the enriched taxonomy is different than a combination of a plurality of weights for the same at least one node in the pre-existing version of the taxonomy based on the generation of the enriched vectors for the nodes in the taxonomy;
said second digital mathematical representation comprises respective weights associated with keywords of the text documents, each indicating a relevance of a respective keyword;
said third digital mathematical representation comprises additional weights associated with additional keywords of the contents; each indicating a corresponding relevance of a respective additional keyword; and
generating the first digital mathematical representation comprises:
  defining a propagation matrix by adjacency associated with the taxonomy and representative of contributions of concepts toward other concepts of the taxonomy;
  defining a matrix of concept vectors representative of the taxonomy;
  defining a matrix of propagation effect depending upon the matrix by adjacency of the matrix of concept vectors; and
  calculating a matrix representing the taxonomy obtained from the matrix of propagation by adjacency from the matrix of propagation effect and from the matrix of concept vectors.

* * * * *